(12) United States Patent
Umezu et al.

(10) Patent No.: US 10,179,280 B2
(45) Date of Patent: *Jan. 15, 2019

(54) PERIPHERAL DEVICE, INFORMATION PROCESSING SYSTEM, AND METHOD FOR CONNECTING THE PERIPHERAL DEVICE

(75) Inventors: Ryuji Umezu, Kyoto (JP); Yuki Taniguchi, Kyoto (JP); Munetaka Nishikawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 606 days.

This patent is subject to a terminal disclaimer.

(21) Appl. No.: 13/590,427

(22) Filed: Aug. 21, 2012

(65) Prior Publication Data

US 2013/0058659 A1 Mar. 7, 2013

(30) Foreign Application Priority Data

Sep. 5, 2011 (JP) ................................ 2011-192529

(51) Int. Cl.
*A63F 13/235* (2014.01)
*A63F 13/98* (2014.01)
(Continued)

(52) U.S. Cl.
CPC ............ *A63F 13/235* (2014.09); *A63F 13/98* (2014.09); *G06F 1/169* (2013.01); *G06F 1/1632* (2013.01);
(Continued)

(58) Field of Classification Search
CPC .......................... A63F 13/06; A63F 2300/1025
(Continued)

(56) References Cited

U.S. PATENT DOCUMENTS 6,773,349 B2 8/2004 Hussaini et al.
6,811,491 B1 11/2004 Levenberg et al.
(Continued)

FOREIGN PATENT DOCUMENTS

EP 0 695 566 A1 2/1996
JP H07-295939 11/1995
(Continued)

OTHER PUBLICATIONS

"CYBER Rubber coat grip (for 3DS)" [online], searched on Dec. 13, 2013, CYBER Gadget Corporation, Internet <URL: http://www.home.cybergadget.co.jp/products/4544859012082/> and English translation thereof, 3 pages.
(Continued)

*Primary Examiner* — Jefferey F Harold
*Assistant Examiner* — Omer Khalid
(74) *Attorney, Agent, or Firm* — Nixon & Vanderhye P.C.

(57) ABSTRACT

An example of peripheral device adds a predetermined function to a mobile device having an infrared communication function. The peripheral device includes an additional function unit, an infrared communication unit, and a support unit. The additional function unit has the predetermined function. The infrared communication unit is capable of performing infrared communication with the mobile device. The support unit detachably supports the mobile device so that a light emitting/receiving unit for infrared light of the mobile device is positioned so as to be capable of transmitting or receiving infrared light to or from the infrared communication unit.

28 Claims, 10 Drawing Sheets

(51) Int. Cl.
*G06F 1/16* (2006.01)
*H04B 10/114* (2013.01)

(52) U.S. Cl.
CPC ....... *G06F 1/1698* (2013.01); *H04B 10/1143* (2013.01); *A63F 2300/1018* (2013.01); *A63F 2300/1031* (2013.01); *A63F 2300/1043* (2013.01)

(58) Field of Classification Search
USPC ........... 348/164, 47, 734; 345/419; 398/128; 463/38
See application file for complete search history.

(56) References Cited

U.S. PATENT DOCUMENTS

| | | | |
|---|---|---|---|
| 6,939,232 | B2 | 9/2005 | Tanaka et al. |
| 7,383,507 | B2 * | 6/2008 | Shibamiya ............. G08C 17/02 348/E5.103 |
| 7,942,745 | B2 * | 5/2011 | Ikeda ...................... A63F 13/06 340/12.22 |
| 8,289,702 | B2 | 10/2012 | Karwan |
| 9,335,793 | B2 * | 5/2016 | Rothkopf ............... G06F 1/1632 |
| 2003/0220145 | A1 | 11/2003 | Erickson et al. |
| 2004/0108997 | A1 | 6/2004 | Lee |
| 2006/0030380 | A1 | 2/2006 | Pentinpuro |
| 2007/0052177 | A1 | 3/2007 | Ikeda et al. |
| 2007/0281787 | A1 | 12/2007 | Numata et al. |
| 2009/0063711 | A1 | 3/2009 | Finkelstein |
| 2012/0039021 | A1 * | 2/2012 | Karwan ................. G06F 1/1632 361/679.01 |
| 2012/0168323 | A1 * | 7/2012 | Schmidt ................. F16M 11/10 206/45.24 |
| 2012/0285847 | A1 | 11/2012 | Olsson et al. |
| 2012/0293953 | A1 * | 11/2012 | Wu ........................ F16M 11/10 361/679.56 |

FOREIGN PATENT DOCUMENTS

| | | |
|---|---|---|
| JP | 08-045392 A | 2/1996 |
| JP | H10-268989 | 10/1998 |
| JP | 2001-216072 | 8/2001 |
| JP | 2001-217926 | 8/2001 |
| JP | 2001-242958 | 9/2001 |
| JP | 2002-123353 A | 4/2002 |
| JP | 2002-182836 A | 6/2002 |
| JP | 2003-018275 A | 1/2003 |
| JP | 2007-054114 A | 3/2007 |
| JP | 2007-299706 A | 11/2007 |
| JP | 4255510 | 2/2009 |
| JP | 2012-139313 | 12/2010 |
| JP | D1407439 | 2/2011 |

OTHER PUBLICATIONS

"Wiki, iControlPad", searched on Dec. 13, 2013, Wikipedia, Internet <URL: http://www.en.wikipedia.org/wiki/IControlPad>, 6 pages.
Notice of Reasons for Refusal issued in Japanese Application No. JP2014-13196, dated Jul. 30, 2015 (with partial translation written thereon).
"Ezplus Controller," Japanese Wikipedia, Last Modified May 10, 2015, Accessed Feb. 2, 2016. <https://ja.wikipedia.org/wiki/Ezplus%E3%82%B3%E3%83%B3%E3%83%88%E3%83%AD%E3%83%BC%E3%83%A9> Translation provided by Google Translate on Feb. 2, 2016.
Jun. 17, 2016 Office Action issued in U.S. Appl. No. 15/052,596.
Jul. 11, 2016 Office Action issued in U.S. Appl. No. 14/876,397 (12 pages).
Jul. 5, 2017 Office Action issued in U.S. Appl. No. 14/876,397.
Mar. 5, 2018 Decision of Reasons for Refusal issued in Japanese Patent Application No. 2016-197802.
Mar. 8, 2018 Notice of Reasons for Refusal issued in Japanese Patent Application No. 2016-197802.
Mar. 8, 2018 Office Action issued in U.S. Appl. No. 14/876,397.
Oct. 11, 2017 Notice of Reasons for Refusal issued in Japanese Patent Application No. 2016-197802.

\* cited by examiner

PERIPHERAL DEVICE, INFORMATION PROCESSING SYSTEM, AND METHOD FOR CONNECTING THE PERIPHERAL DEVICE

CROSS REFERENCE TO RELATED APPLICATION

The disclosure of Japanese Patent Application No. 2011-192529 filed on Sep. 5, 2011 is incorporated herein by reference.

FIELD

This specification discloses a peripheral device connectable to a mobile device, an operation system including the peripheral device, and a method for connecting the peripheral device.

BACKGROUND AND SUMMARY

Conventionally, there are peripheral devices which provide an additional function to a mobile device when being connected to the mobile device. For example, there is a technology by which a connector provided in a controller of a game device is connected to another controller as a peripheral device. When such a technology is used, a wide variety of game operations are made possible by use of two controllers, and thus the range of forms in which the game can be played is expanded.

Generally for connecting a peripheral device to a mobile device, an extension connector provided in the mobile device is used as described above. However, when the mobile device does not include an extension connector, or when another device is connected to the connector, the peripheral device cannot be connected to the mobile device.

Thus, this specification discloses a peripheral device and the like which can be connected to a mobile device by a measure different from use of a connector.

(1)

An example of peripheral device described in this specification is a device for adding a predetermined function to a mobile device having an infrared communication function. The peripheral device comprises an additional function unit, an infrared communication unit, and a support unit. The additional function unit has the predetermined function. The infrared communication unit is capable of performing infrared communication with the mobile device. The support unit detachably supports the mobile device so that a light emitting/receiving unit for infrared light of the mobile device is positioned so as to be capable of transmitting or receiving infrared light to or from the infrared communication unit.

According to the configuration of (1), the support unit supports the mobile device so that the light emitting/receiving unit of the mobile device and the infrared communication unit of the peripheral device are communicable with each other. Therefore, the infrared communication is made possible between the mobile device and the peripheral device by mounting the peripheral device on the mobile device. As a result, the function of the additional function unit of the peripheral device can be added to the mobile device. Namely, according to the configuration of (1), the peripheral device can be connected to the mobile device by a simple configuration which is different from using a connector.

According to the configuration of (1), the communication units of the devices are out of contact with each other when the peripheral device is mounted on the mobile device. Therefore, even if the user drops the devices, the possibility that the communication units are destroyed is low. Thus, a safe information processing system can be provided. According to the configuration of (1), the mobile device performs communication with the peripheral device by use of the infrared communication function of the mobile device. Therefore, the peripheral device is usable for many uses.

(2)

The light emitting/receiving unit may be provided on a side surface of the mobile device. In this case, the support unit includes a wall unit for enclosing side surfaces of the mobile device in a state where the support unit supports the mobile unit. The infrared communication unit is provided at a position of the wall unit which faces the light emitting/receiving unit.

The above-mentioned "wall unit" may be anything which can enclose the side surfaces of the mobile device. The wall unit may be formed to face the entire side surfaces or a part thereof (may be partially opened).

According to the configuration of (2), in the state where the peripheral device is mounted on the mobile device (mounted state), the wall unit encloses the mobile device, and thus the support unit can position the mobile device so that the light emitting/receiving unit of the mobile device is at an appropriate position. Moreover, since the wall unit faces the light emitting/receiving unit of the mobile device, the wall unit can prevent external light from being incident on the light emitting/receiving unit of the mobile device. Therefore, according to the configuration of (2), the wall unit can position the mobile device so that the light emitting/receiving unit of the mobile device is at an appropriate position, and also can block external light. As a result, the peripheral device can perform infrared communication with high precision.

(3)

The light emitting/receiving unit may be provided on a predetermined surface of the mobile device. In this case, the support unit includes a portion facing the predetermined surface of the mobile device in a state where the support unit supports the mobile device. The infrared communication unit is provided on a portion of the support unit which faces the light emitting/receiving unit.

According to the configuration of (3), the support unit has a portion facing the light emitting/receiving unit of the mobile device of the mobile device. The portion can prevent external light from being incident on the light emitting/receiving unit. Owing to this, the external light can be blocked, and thus the peripheral device can perform infrared communication with high precision.

(4)

The support unit may include a holding unit for holding the mobile device so that the mobile device is fixed with respect to the peripheral device.

According to the configuration of (4), the support unit can support the mobile device in a fixed manner. Therefore, the support unit can fix and position the mobile device with certainty, and also can realize efficient communication by blocking the external light owing to the configuration of (3).

(5)

The support unit may support the mobile device by pressing side surfaces of the mobile device with an elastic material.

According to the configuration of (5), the portion of the peripheral device which is in contact with the mobile device is formed of an elastic material. Therefore, the possibility that the contact portions of the mobile device and the peripheral device are destroyed by an impact can be reduced. Namely, even if the mobile device having the peripheral device mounted thereon receives an impact when, for example, falling, the possibility that the two devices are destroyed can be reduced. Thus, the devices which are not easily destroyed can be provided.

(6)

The mobile device may include two housings foldable with respect to each other. In this case, the support unit supports one of the two housings in a state where a surface thereof which is an inner surface when the two housings are folded is exposed.

According to the configuration of (6), the support unit can support the mobile device in the state where the inner surfaces of the two housings of the mobile device are exposed. Therefore, the user can open or close the mobile device in the mounted state, without detaching the peripheral device from the mobile device. The peripheral device which is easy to use can be provided.

(7)

The additional function unit may include an operation unit. In this case, the infrared communication unit transmits operation data representing an operation to be made on the operation unit to the mobile device.

According to the configuration of (7), the peripheral device can add the operation function to the mobile device. Namely, the user makes an operation using the operation unit of the peripheral device and thus can make a more complicated operation as compared with when using the mobile device independently.

(8)

The mobile device may include a predetermined operation member provided on one side of a predetermined operation surface in a left-right direction. In this case, the operation unit includes an operation member located on a portion which is outer to the operation surface and is on an opposite side to the one side, in a state where the support unit supports the mobile device.

The "operation surface" is a surface exposed in the mounted state, which is seen by the user while the mobile device is in use. The operation surface is, for example, a surface on which the display screen is provided.

The mobile device may include the predetermined operation member on at least one side of the operation surface. For example, the mobile device may include an operation member also on the other side.

According to the configuration of (8), an operation member is added by the peripheral device on one side of the operation surface of the mobile device in a left-right direction, whereas no operation member is added by the peripheral device on the other side of the operation surface. Therefore, the user can hold the information processing system by holding the peripheral device with his/her hand operating the operation member while pressing the mobile device with the other hand. Namely, since the user presses the mobile device when holding the information processing system, the user's hand prevents the peripheral device from being detached from the mobile device.

(9)

The predetermined operation member included in the mobile device may be a direction input device capable of specifying a direction and a magnitude; and the operation member included in the operation unit may be a direction input device capable of specifying a direction and a magnitude.

The "direction input device" refers to a concept encompassing an operation device capable of specifying a direction and a magnitude, such as a slide pad, an analog stick or the like in the embodiment described later. The "direction input device" may be called an "analog direction specifying unit".

According to the configuration of (9), the direction input device is located on the left side and the right side of the operation surface of the mobile device. Therefore, the user can operate the slide pads with both of his/her hands, respectively. Namely, the peripheral device is usable so that a game operation using two direction input devices can be made by the mobile device.

(10)

The mobile device may include a first operation button provided on the one side of a predetermined side surface and a second operation button provided on the other side of the predetermined side surface. In this case, the support unit includes a wall unit for enclosing side surfaces of the mobile device in the state where the support unit supports the mobile device. The wall unit is opened at least in a portion facing the first operation button. The operation unit includes an operation button located at a position on the other side beyond the second operation button, in the state where the support unit supports the mobile device.

The "position on the other side beyond the second operation button" is, in other words, a position outer to the second operation button as seen from the center of the mobile device in the left-right direction.

According to the configuration of (10), the mobile device includes the first operation button and the second operation button which are located on both sides of a predetermined side surface. Regarding the first operation button provided on one side, the wall unit is opened at least in a portion facing the first operation button. Therefore, the user can easily operate the first operation button in the mounted state. Regarding the second operation button provided on the other side, the operation member added to the other side of the operation surface of the mobile device ((7) above) makes it difficult to press the second operation button. However, an additional operation button of the peripheral device is provided outer to the second operation button. Therefore, the user can easily operate the additional operation button in the mounted state. Therefore, according to the configuration of (10), even in the mounted state, the user can operate the operation buttons located on both sides of the predetermined side surface in substantially the same manner as when operating the mobile device independently.

(11)

The support unit may support the mobile device by supporting side surfaces of the mobile device in a state where at least a part of an outer surface of the mobile device is exposed.

According to the configuration of (11), the user can easily detach the peripheral device from the mobile device by pressing the outer surface of the mobile device.

(12)

The support unit may support side surfaces of the mobile device in a state where a predetermined surface of the mobile device is exposed. In this case, the support unit further includes a holding unit which can be held by a user, the holding unit being located on a surface rear to the predetermined surface in a state where the support unit supports the mobile device.

According to the configuration of (12), the user can hold the holding unit of the peripheral device to use the mobile device in the mounted state. For mounting the peripheral device on the mobile device, the holding unit makes it easy to hold the entire device (the mobile device and the peripheral device), although the provision of the holding unit increases the size of the entire device. According to the configuration of (11), the user can hold the holding unit to use the mobile device while looking at the predetermined surface. Therefore, in the case where the predetermined surface is the operation surface of the mobile device (the surface that the user looks at while the mobile device is in use), the user can easily hold the peripheral device while easily looking at the operation surface.

(13)

Another example of peripheral device described in this specification is a device detachable from the mobile device having an infrared communication function.

The mobile device includes a plate-like first housing, a second housing, a first direction input device, a first operation button, and a second operation button. The second housing is connectable to the first housing so that the first housing and the second housing are foldable with respect to each other. The first direction input device is provided on one side of an inner surface of the first housing in a left-right direction, and is capable of specifying a direction and a magnitude. The first operation button is provided on the one side of a side surface of the first housing. The second operation button is provided on the other side of the side surface.

The peripheral device includes an operation unit, an infrared communication unit, a support unit, and a holding unit. The infrared communication unit transmits operation data representing an operation to be made on the operation unit to the mobile device by infrared communication. The support unit supports the mobile device so that a light emitting/receiving unit for infrared light of the mobile device is positioned so as to be capable of transmitting or receiving infrared light to or from the infrared communication unit. The holding unit is located on a surface rear to the first housing in a state where the support unit supports the mobile device, and can be held by a user.

The support unit includes a wall unit for supporting side surfaces of the first housing and having an opening at least in a portion facing the first operation button.

The operation unit includes a second direction input device and an operation button. The second direction input device is located on a portion which is outer to the inner surface of the first housing and is on an opposite side to the one side, in the state where the support unit supports the mobile device, and is capable of specifying a direction and a magnitude. The operation button is located at a position on the other side beyond the second operation button, in the state where the support unit supports the mobile device.

The portion of the wall unit which supports the one side of the first housing has a width which is set to such a value that the first direction input device is operable with a hand holding the holding unit.

According to the configuration of (13), substantially the same effects as those of (1) and (7) through (10) described above can be provided. According to the configuration of (13), the portion of the wall unit which supports the one side of the first housing is set appropriately, and thus the user can easily operate the first direction input device with his/her hand holding the holding unit.

This specification disclose an example of information processing system including the mobile device and the peripheral device having the configurations of (1) through (13). This specification also discloses an example of connection method for connecting the peripheral device having the configuration of (1) through (13) to the mobile device having the configuration of (1) through (13).

According to the peripheral device, information processing system and connection method of the peripheral device, the peripheral device detachably supports the mobile device so that the mobile device is located at such a position that the infrared communication unit of the mobile device and the infrared communication unit of the peripheral device are communicable with each other. As a result, the peripheral device can be connected to the mobile device by a method different from using a connector.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Outline of Information Processing System]

Figure 1:
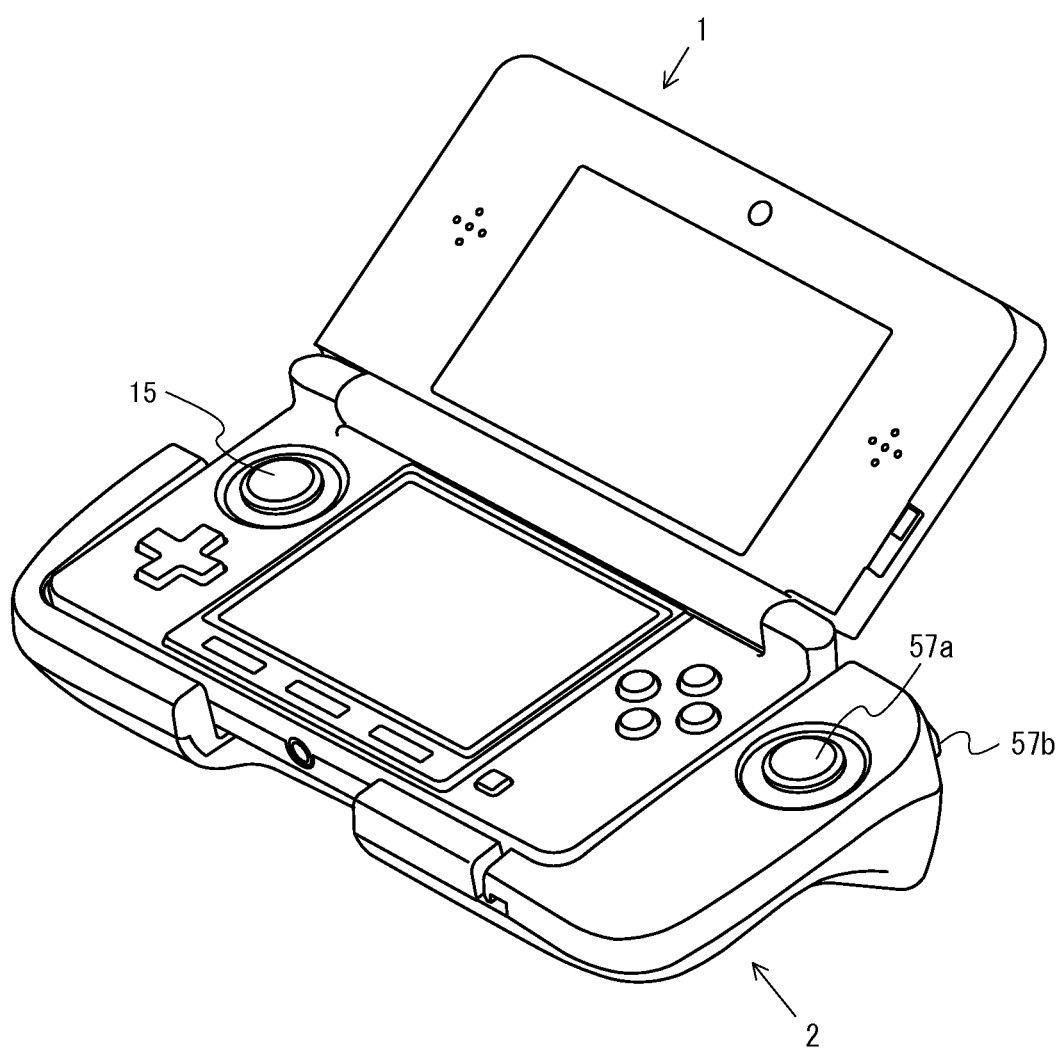
FIG. 1 shows an example non-limiting information processing system in this embodiment.

Hereinafter, an information processing system including a peripheral device according to this embodiment will be described with reference to the drawings. FIG. 1 shows an example of an information processing system in this embodiment. As shown in FIG. 1, the information processing system includes a mobile device 1 and a peripheral device 2. The peripheral device 2 is detachably mountable on the mobile device 1.

The mobile device 1 may be any type of mobile information processing device. In this embodiment, the mobile device 1 is a game device capable of executing game processing. In other embodiments, the mobile device 1 may be, for example, a mobile phone, a smart phone, a mobile information terminal or the like. The mobile device 1 has an infrared communication function. In this embodiment, the mobile device 1 is of a foldable type. In other embodiments, the mobile device 1 may not be of the foldable type.

The peripheral device 2 is a device for adding a predetermined function to the mobile device 1. The predetermined function may be any function. In this embodiment, the predetermined function is an operation function. More specifically, the peripheral device 2 includes an operation section including a slide pad 57*a*, an operation button 57*b* and the like, and transmits operation data representing an operation to be made on the operation section to the mobile device 1. The peripheral device 2 has an infrared communication function, and the communication between the peripheral device 2 and the mobile device 1 is performed by infrared communication. In other embodiments, the peripheral device 2 may be an acceleration sensor, a gyrosensor, a GPS sensor or the like which adds a sensor function of sensing predetermined information, may add a receiving function of receiving a predetermined signal (e.g., a TV broadcast signal), or may add a display function.

As described above, the peripheral device 2 in this embodiment adds the operation section to the mobile device 1. A user is allowed to perform a wide variety of, and complicated, game operations by mounting the peripheral device 2 on the mobile device 1. Specifically, in the state where the peripheral device 2 is mounted on the mobile device 1, as shown in FIG. 1, two slides pads 15 and 57*a* are located on the left side and on the right side respectively, so that the user can operate the slide pads with both hands respectively. Namely, the peripheral device 2 in this embodiment is usable to allow the user to perform a game operation using two direction input devices on the mobile device 1. In a game system using a controller dedicated for games such as, for example, a non-mobile game device, it is common to use two direction input devices (an analog direction specifying section) as described above. For example, many games are provided in which one direction input device is used to move a player character while the other direction input device is used to move the target of a gun or the like. The peripheral device 2 in this embodiment is usable for the purpose of applying a game (a game application), which is to be played with a game operation using two direction input devices as described above, to a mobile game device without spoiling the operability of the game. The game application executable by the mobile device 1 may execute a game for which a game operation can be performed only when the peripheral device 2 is mounted on the mobile device 1, or may execute a game for which a game operation can be performed when there is only the mobile device 1 (when the peripheral device 2 is not mounted on the mobile device 1).

[2. Configuration of Mobile Device]

Figure 2:
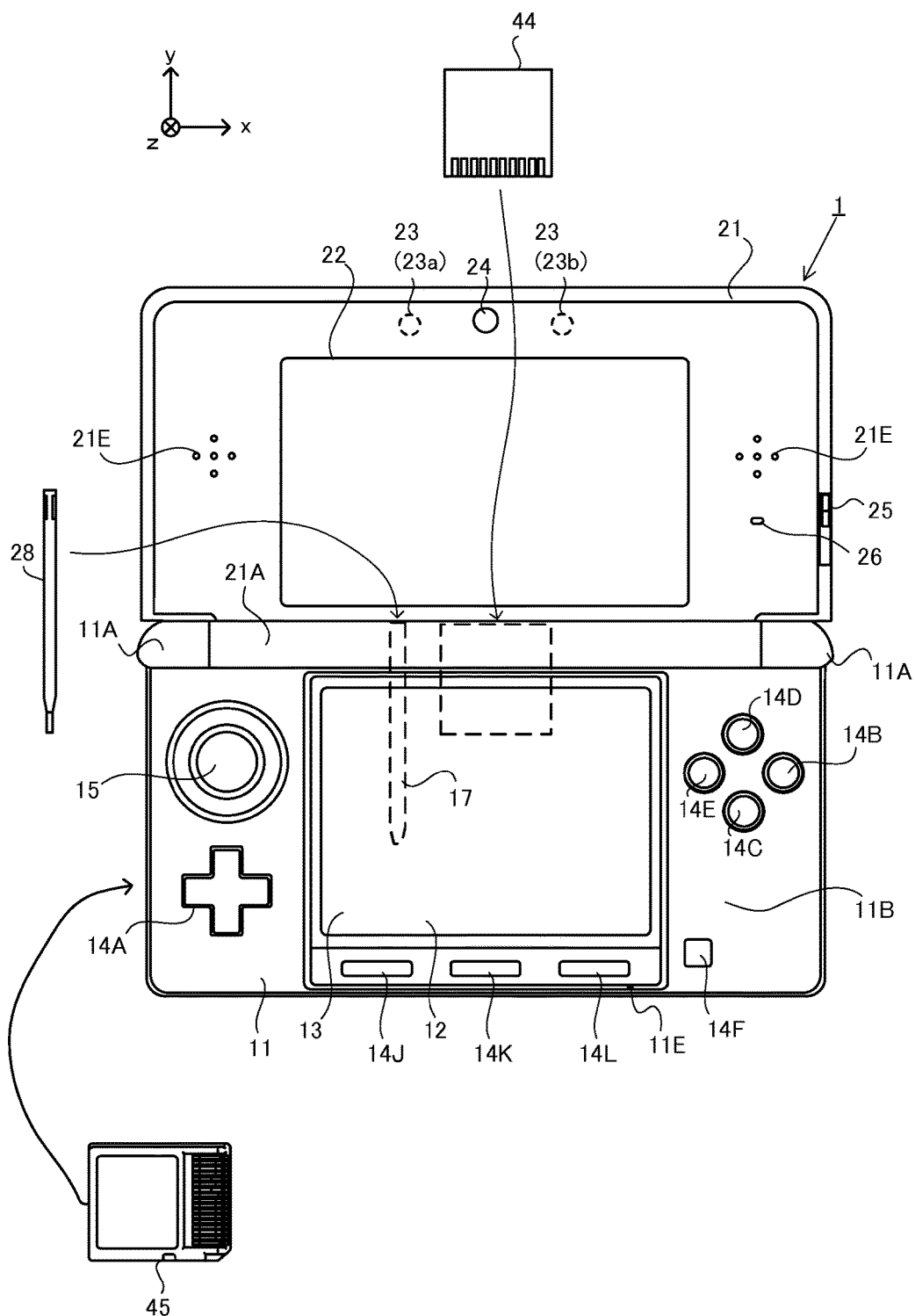
FIG. 2 is a front view of an example non-limiting mobile device.
Figure 3:
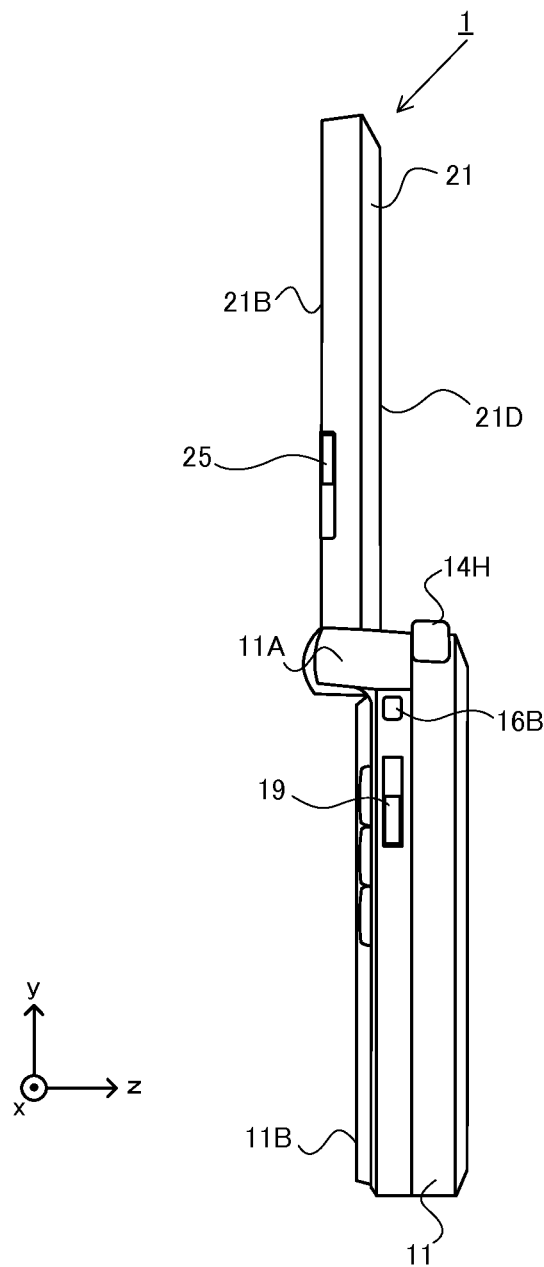
FIG. 3 is a right side view of the example non-limiting mobile device.
Figure 4:
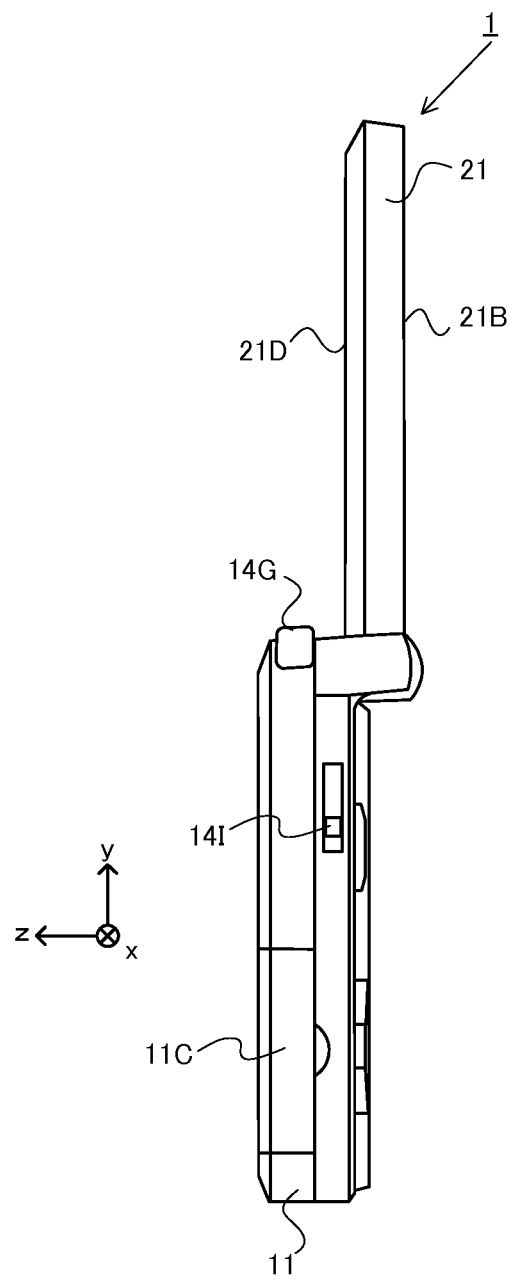
FIG. 4 is a left side view of the example non-limiting mobile device.
Figure 5:
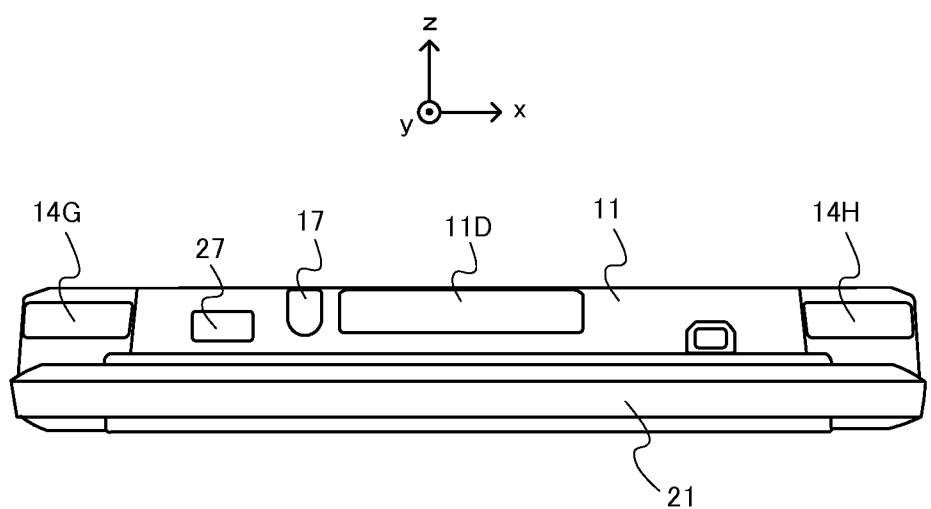
FIG. 5 is as top view of the example non-limiting mobile device.
Figure 6:
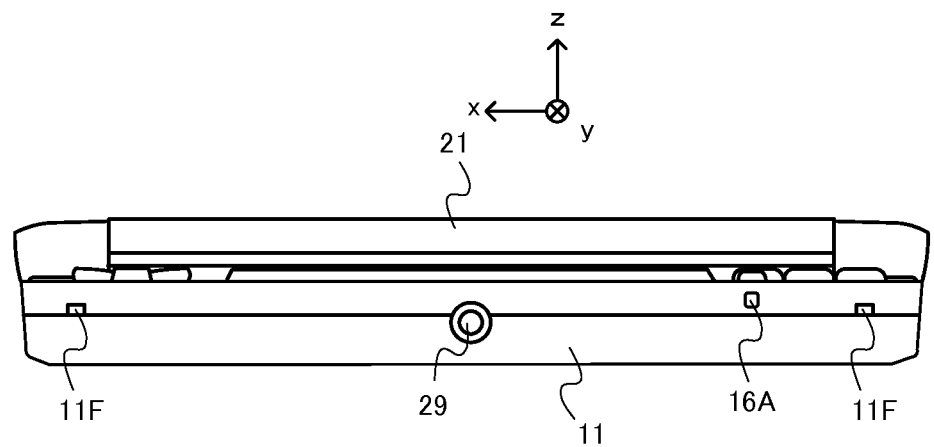
FIG. 6 is a bottom view of the example non-limiting mobile device.

Hereinafter, with reference to FIG. 2 through FIG. 7, a configuration of the mobile device 1 will be described. FIG. 2 through FIG. 6 show an external appearance of the mobile device 1. The mobile device 1 is a mobile game device and is configured to be foldable. FIG. 2 through FIG. 6 show the mobile device 1 in an open state. FIG. 2 is a front view of the mobile device 1. FIG. 3 is a right side view of the mobile device 1, and FIG. 4 is a left side view of the mobile device 1. FIG. 5 is a top view of the mobile device 1, and FIG. 6 is a bottom view of the mobile device 1. The mobile device 1 can execute a predetermined game program, and can display an image captured by a virtual camera which is set in a virtual space. The mobile device 1 can capture an image by a camera, and display the captured image on a screen or store data of the captured image.

First, with reference to FIG. 2 through FIG. 6, an external appearance of the mobile device 1 will be described. As shown in FIG. 2 through FIG. 6, the mobile device 1 includes a lower housing 11 and an upper housing 21. The lower housing 11 and the upper housing 21 are connected together so that they can be opened/closed (folded). In this embodiment, the housings 11 and 21 each have a landscape-oriented rectangular plate shape and are pivotally connected together along their long-side portions.

As shown in FIG. 2 through FIG. 4, protruding portions 11A protruding in a direction vertical to an inner surface (main surface) 11B of the lower housing 11 are provided along the upper long-side portion of the lower housing 11. A protruding portion 21A protruding from a lower side surface of the upper housing 21 in a direction vertical to the lower side surface is provided along the lower long-side portion of the upper housing 21. The lower housing 11 and the upper housing 21 are connected together so that they can be folded by coupling the protruding portions 11A of the lower housing 11 with the protruding portion 21A of the upper housing 21.

(Description of Lower Housing)

First, a configuration of the lower housing 11 will be described. As shown in FIG. 2 through FIG. 6, a lower LCD (Liquid Crystal Display) 12, a touch panel 13, operation buttons 14A through 14L, a slide pad 15, LEDs 16A and 16B, and an insertion hole 17 are provided in the lower housing 11. Hereinafter, these components will be described in detail.

As shown in FIG. 2, the lower LCD 12 is accommodated in the lower housing 11. The lower LCD 12 has a landscape-oriented shape and is placed so that the long-side direction thereof coincides with the long-side direction of the lower housing 11. The lower LCD 12 is placed in the center of the lower housing 11 with respect to the left-right direction (the x-axis direction shown in FIG. 2). The lower LCD 12 is provided on the inner surface (main surface) of the lower housing 11, and the screen of the lower LCD 12 is exposed through an opening provided in the lower housing 11. When the mobile device 1 is not used, it is possible to prevent the screen of the lower LCD 12 from being stained or scratched by having it in the closed state. The number of pixels of the lower LCD 12 may be, for example, 256 dots×192 dots (horizontal×vertical). As opposed to an upper LCD 22 to be described later, the lower LCD 12 is a display device for displaying an image two-dimensionally (not stereoscopically viewable). Note that although an LCD is used as the display device in this embodiment, any other display device may be used such as a display device using EL (Electro Luminescence), for example. A display device of any resolution may be used as the lower LCD 12.

As shown in FIG. 2, the mobile device 1 includes the touch panel 13 as an input device. The touch panel 13 is mounted on the screen of the lower LCD 12. Note that in this embodiment, the touch panel 13 is a resistive film type touch panel. Note, however, that the touch panel is not limited to being of the resistive film type, but may be a touch panel of any type such as, for example, an electrostatic capacitance type or the like. In this embodiment, a touch panel having the same resolution (detection precision) as the resolution of the lower LCD 12 is used as the touch panel 13. Note, however, that it is not always necessary that the resolution of the touch panel 13 and the resolution of the lower LCD 12 coincide with each other. The insertion hole 17 (broken line in FIG. 2) is provided in an upper side surface of the lower housing 11. The insertion hole 17 can accommodate a touch pen 28 which is used for performing operations on the touch panel 13. Note that although an input on the touch panel 13 is usually made by using the touch pen 28, this embodiment is not limited to use of the touch pen 28, and a finger of the user may be used for making an input on the touch panel 13.

The operation buttons 14A through 14L are each an input device for making a predetermined input. As shown in FIG.

2, among the operation buttons 14A through 14L, a cross button (direction input button) 14A, a button 14B, a button 14C, a button 14D, a button 14E, a power button 14F, a select button 14J, a HOME button 14K, and a start button 14L are provided on the inner surface (main surface) of the lower housing 11. The cross button 14A is cross-shaped, and includes buttons for specifying up, down, left and right directions. The buttons 14A through 14E, the select button 14J, the HOME button 14K, and the start button 14L are assigned functions in accordance with a program executed by the mobile device 1. For example, the cross button 14A is used for a selection operation, or the like, and the operation buttons 14B through 14E are used for a determination operation, a cancellation operation, etc. The power button 14F is used for turning ON/OFF the power of the mobile device 1.

The slide pad 15 is a direction input device for specifying a direction and a magnitude, and is provided on the inner surface of the lower housing 11. As shown in FIG. 1, the slide pad 15 is provided above the cross button 14A. The slide pad 15 is configured so that a stick portion operable by a finger is slid in any direction (at any angle in up, down, left, right and diagonal directions) with respect to the inner surface of the lower housing 11. The slide pad 15 functions in accordance with the program executed by the mobile device 1. For example, when a game in which a predetermined object appears in a three-dimensional virtual space is executed by the mobile device 1, the slide pad 15 functions as an input device for moving the predetermined object in the three-dimensional virtual space. In this case, the predetermined object is moved in a direction in which a movable portion (stick portion) of the slide pad 15 is slid. In other embodiments, an input direction device having a movable portion which is tilted in any direction among the up, down, left, right and diagonal directions by any amount to realize an analog input may be used.

In the inner surface of the lower housing 11, a microphone hole 11E is provided. In this embodiment, the microphone hole 11E is provided below (below and right to) the lower LCD 12. Inside the microphone hole 11E, a microphone (see FIG. 7) as a sound input device described later is provided, and detects sound outside the mobile device 1.

As shown in FIG. 3 through FIG. 5, an L button 14G and an R button 14H are provided on the upper side surface of the lower housing 11. The L button 14G is provided on the left side (herein, at the left end) of the upper side surface of the lower housing 11, and the R button 14H is provided on the right side (herein, at the right end) of the upper side surface of the lower housing 11. For example, the L button 14G and the R button 14H can function as shutter buttons (image-capturing instruction buttons) of a camera. As shown in FIG. 4, a sound volume adjustment switch 14I is provided on a left side surface of the lower housing 11. The sound volume adjustment switch 14I is used for adjusting the sound volume of a speaker of the mobile device 1.

On the upper side surface of the lower housing 11, a light emitting/receiving section 27 of an infrared communication module 37 is provided. As described above, the mobile device 1 has an infrared communication function. Specifically, the mobile device 1 includes the infrared communication module 37, and the light emitting/receiving section 27 is provided on a surface of the housing 11 or 21 of the mobile device 1. The light emitting/receiving section 27 includes, for example, an infrared filter for transmitting light of a predetermined frequency band and a module located inside the infrared filter for receiving or transmitting infrared light. In this embodiment, the light emitting/receiving section 27 is provided on the upper side surface of the lower housing 11 so that when the lower housing 11 is held by the user, an infrared signal is emitted forward with respect to the user (see FIG. 5). In other embodiments, the light emitting/receiving section 27 may be provided at any position, for example, on any other side surface of the lower housing 11, on an outer surface of the lower housing 11 (the back surface opposite to the inner surface, i.e., the main surface, on which the lower LCD 21 is provided), or the like.

As shown in FIG. 4, a cover portion 11C which can be opened/closed is provided on the left side surface of the lower housing 11. A connector (not shown) for electrically connecting the mobile device 1 and a data storage external memory 45 with each other is provided inside the cover portion 11C. The data storage external memory 45 is detachably connected to the connector. The data storage external memory 45 is used for, for example, recording (storing) data of an image captured by the mobile device 1. The connector and the cover portion 11C thereof may be provided on a right side surface of the lower housing 11.

As shown in FIG. 5, a cover portion 11D which can be opened/closed is provided on the upper side surface of the lower housing 11. A connector (not shown) for electrically and detachably connecting the mobile device 1 and an external memory 44 having a game program recorded therein with each other is provided inside the cover portion 11D. A predetermined game program is executed when the external memory 44 is connected to the mobile device 1. The connector and the cover portion 11D thereof may be provided on any other side surface (e.g., the right side surface, etc.) of the lower housing 11.

A first LED 16A for notifying the user of the ON/OFF status of the power supply of the mobile device 1 is provided on the lower side surface of the lower housing 11, and a second LED 16B for notifying the user of the wireless communication establishment status of the mobile device 1 is provided on the right side surface of the lower housing 11. The mobile device 1 can wirelessly communicate with other devices, and the second LED 16B is lit while the wireless communication is established. The mobile device 1 has a function of connecting to a wireless LAN by a scheme conformed to the IEEE 802.11.b/g standard, for example. A wireless switch 19 for enabling/disabling the wireless communication function is provided on the right side surface of the lower housing 11 (see FIG. 3).

The mobile device 1 includes a sound output terminal 29 to which a sound output section such as an earphone or the like is connectable. The sound output terminal 29 may be provided at any position, and in this embodiment, is provided on the lower side surface of the lower housing 11 (see FIG. 6). In other embodiments, the sound output terminal 29 may be provided on the left or right side surface or the upper side surface of the lower housing 11.

The mobile device 1 includes has strap holes 11F to which a strap is attachable to the mobile device 1. As shown in FIG. 6, in this embodiment, the strap holes 11F are provided on the lower side surface of the lower housing 11. Here, two strap holes 11F are provided on the left side and on the right side of the lower side surface, but there is no limitation on the number of strap hole(s) 11F. There is no limitation on the position(s) of the strap hole(s) 11F. The strap hole(s) 11F may be provided on any other side surface or the outer surface of the lower housing 11.

Although not shown, the lower housing 11 accommodates a rechargeable battery serving as the power supply of the mobile device 1, and the battery can be charged through a terminal provided on a side surface (e.g., the upper side surface) of the lower housing 11.

(Description of Upper Housing)

Next, a configuration of the upper housing 21 will be described. As shown in FIG. 2 and FIG. 3, the upper LCD (Liquid Crystal Display) 22, an outer camera 23 (a left-eye camera 23a and a right-eye camera 23b), an inner camera 24, a 3D adjustment switch 25, and a 3D indicator 26 are provided in the upper housing 21. Hereinafter, these components will be described in detail.

As shown in FIG. 2, the upper LCD 22 is accommodated in the upper housing 21. The upper LCD 22 has a landscape-oriented shape and is placed so that the long-side direction thereof coincides with the long-side direction of the upper housing 21. The upper LCD 22 is placed in the center of the upper housing 21 with respect to the left-right direction (the x-axis direction shown in FIG. 2). The area size of the screen of the upper LCD 22 is set to be larger than the area size of the screen of the lower LCD 12. Specifically, the screen of the upper LCD 22 is set to be wider than the screen of the lower LCD 12. That is, the proportion of the horizontal width in the aspect ratio of the screen of the upper LCD 22 is set to be larger than the proportion of the horizontal width in the aspect ratio of the screen of the lower LCD 12.

The screen of the upper LCD 22 is provided on an inner surface (main surface) 21B of the upper housing 21, and the screen of the upper LCD 22 is exposed through an opening provided in the upper housing 21. As shown in FIG. 2, the inner surface of the upper housing 21 is covered with a transparent screen cover. The screen cover protects the screen of the upper LCD 22 and makes the upper LCD 22 integral with the inner surface of the upper housing 21, thus giving a sense of unity. The number of pixels of the upper LCD 22 may be, for example, 640 dots×200 dots (horizontal×vertical). Note that although the upper LCD 22 is a liquid crystal display device in this embodiment, a display device using EL (Electro Luminescence), etc., may be used, for example. A display device of any resolution may be used as the upper LCD 22.

The upper LCD 22 is a display device capable of displaying a stereoscopically viewable image. In this embodiment, a left-eye image and a right-eye image are displayed using substantially the same display area. Specifically, the upper LCD 22 is a display device of such a scheme that the left-eye image and the right-eye image are displayed alternately in the horizontal direction by a predetermined unit (e.g., in units of one column). Alternatively, the upper LCD 22 may be a display device of such a scheme that the left-eye image and the right-eye image are displayed alternately in time division. In this embodiment, the upper LCD 22 is a display device that enables stereoscopic viewing with naked eyes. As the LCD 22, a display device of a lenticular type or a parallax barrier type is used so that the left-eye image and the right-eye image displayed alternately in the horizontal direction can be seen separately by the left eye and the right eye, respectively. In this embodiment, the upper LCD 22 is of the parallax barrier type. The upper LCD 22 displays an image that can be stereoscopically viewed with the naked eyes (a stereoscopic image) by using the right-eye image and the left-eye image. That is, the upper LCD 22 can display a stereoscopic image (a stereoscopically viewable image) that has a stereoscopic feel to the user by allowing the left eye of the user to view the left-eye image and the right eye of the user the right-eye image using a parallax barrier. With the upper LCD 22, the parallax barrier can be disabled, and when the parallax barrier is disabled, the upper LCD 22 can display an image two-dimensionally (a two-dimensionally viewable image can be displayed, in an opposite sense to the stereoscopically viewable image described above). Thus, the upper LCD 22 is a display device that can be switched between a stereoscopic display mode where a stereoscopically viewable image is displayed and a two-dimensional display mode where an image is two-dimensionally displayed (a two-dimensionally viewable image is displayed). The display mode switching is done with the 3D adjustment switch 25 to be described later.

The outer camera 23 is provided on an outer surface (the back surface opposite to the main surface on which the upper LCD 22 is provided) 21D of the upper housing 21, and is a stereo camera whose image-capturing direction is the normal direction to the outer surface 21D. The outer camera 23 includes two cameras, i.e., the left-eye camera 23a and the right-eye camera 23b. The left-eye camera 23a and the right-eye camera 23b are placed so that their image-capturing directions are parallel to each other. The left-eye camera 23a and the right-eye camera 23b each include an image-capturing element (e.g., a CCD image sensor, a CMOS image sensor, etc.) having a predetermined resolution, and a lens.

As shown by broken lines in FIG. 2, the left-eye camera 23a and the right-eye camera 23b of the outer camera 23 are arranged so as to be parallel to the horizontal direction of the screen of the upper LCD 22. That is, the left-eye camera 23a and the right-eye camera 23b are arranged so that the straight line connecting the two cameras with each other is parallel to the horizontal direction of the screen of the upper LCD 22. The broken lines representing the left-eye camera 23a and the right-eye camera 23b in FIG. 2 mean that the left-eye camera 23a and the right-eye camera 23b are present on the outer surface which is on the opposite side from the inner surface of the upper housing 21. The left-eye camera 23a and the right-eye camera 23b are located on the left side and on the right side, respectively, when the user views the screen of the upper LCD 22 from the front side as shown in FIG. 2. The interval between the left-eye camera 23a and the right-eye camera 23b is set to be about equal to the interval between the eyes of a human, and may be set in the range of 30 mm to 70 mm, for example. Note that the interval between the left-eye camera 23a and the right-eye camera 23b is not limited to this range. In other embodiments, the interval between the two cameras 23a and 23b may be variable.

The left-eye camera 23a and the right-eye camera 23b are placed at positions that are in symmetry with respect to the center of the upper LCD 22 (the upper housing 21) in the left-right direction. That is, the left-eye camera 23a and the right-eye camera 23b are placed at positions that are in symmetry with respect to a line that bisects the upper LCD 22 left and right. The left-eye camera 23a and the right-eye camera 23b are placed on the reverse side of an upper portion of the upper housing 21 at positions above the upper edge of the screen of the upper LCD 22 in a state where the upper housing 21 is open. That is, the left-eye camera 23a and the right-eye camera 23b are placed on the outer surface of the upper housing 21, and above the upper edge of the upper LCD 22 as the upper LCD 22 is projected onto the outer surface.

Thus, as the two cameras of the outer camera 23 are placed at positions that are in symmetry with respect to the center of the upper LCD 22 in the left-right direction, the image-capturing direction of the outer camera 23 can be made to coincide with the viewing direction of the user when the user is looking straight at the upper LCD 22 from the front. Since the outer camera 23 is placed at positions on the reverse side above the upper edge of the screen of the upper LCD 22, the outer camera 23 and the upper LCD 22 do not interfere with each other inside the upper housing 21. Therefore, as compared with a case where the outer camera 23 is placed on the reverse side of the screen of the upper LCD 22, the upper housing 21 can be made thin.

The inner camera 24 is a camera which is provided on the inner surface (main surface) 21B of the upper housing 21 and whose image-capturing direction is the normal direction to the inner surface. The inner camera 24 includes an image-capturing element (e.g., a CCD image sensor, a CMOS image sensor, etc.) having a predetermined resolution, and a lens.

As shown in FIG. 2, the inner camera 24 is placed in an upper portion of the upper housing 21 above the upper edge of the screen of the upper LCD 22 in a state where the upper housing 21 is open, and is placed at the central position of the upper housing 21 in the left-right direction. Specifically, as shown in FIG. 2, the inner camera 24 is placed on the inner surface of the upper housing 21 at a position in the middle between the left and right cameras (the left-eye camera 23a and the right-eye camera 23b) of the outer camera 23 on the reverse side therefrom. That is, the inner camera 24 is provided in the middle between the left and right cameras provided on the outer surface of the upper housing 21 as the left and right cameras are projected onto the inner surface of the upper housing 21.

Thus, the inner camera 24 captures an image in the direction opposite to that of the outer camera 23. The inner camera 24 is provided on the inner surface of the upper housing 21 at a position in the middle between the left and right cameras of the outer camera 23 on the reverse side therefrom. Thus, when the user is looking straight at the upper LCD 22 from the front, it is possible to capture an image of the face of the user from the front by the inner camera 24. Since the left and right cameras of the outer camera 23 and the inner camera 24 do not interfere with each other inside the upper housing 21, the upper housing 21 can be made thin.

The 3D adjustment switch 25 is a sliding switch, and is a switch used for switching between the display modes of the upper LCD 22 as described above. The 3D adjustment switch 25 is used for adjusting the stereoscopic feel of the stereoscopically viewable image (the stereoscopic image) displayed on the upper LCD 22. As shown in FIG. 2 and FIG. 3, the 3D adjustment switch 25 is provided at an edge portion of the inner surface and the right side surface of the upper housing 21, and is provided at such a position that the 3D adjustment switch 25 can be viewed when the user is looking straight at the upper LCD 22 from the front.

A depressed portion is formed in a right edge portion of the inner surface of the upper housing 21, and the 3D adjustment switch 25 is provided in the depressed portion 21C. The 3D adjustment switch 25 is located so as to be viewed from the front surface and the right side surface of the upper housing 21. A slider of the 3D adjustment switch 25 is slidable to any position in a predetermined direction (an up-down direction), and the display mode of the upper LCD 22 is set in accordance with the position of the slider.

The 3D indicator 26 indicates whether the upper LCD 22 is in the stereoscopic display mode. The 3D indicator 26 is an LED, and is lit when the stereoscopic display mode of the upper LCD 22 is enabled. As shown in FIG. 2, the 3D indicator 26 is provided on the inner surface of the upper housing 21, and is provided in the vicinity of the screen of the upper LCD 22. Therefore, when the user is looking straight at the screen of the upper LCD 22 from the front, the user easily views the 3D indicator 26. Accordingly, the user can easily recognize the display mode of the upper LCD 22 while viewing the screen of the upper LCD 22.

Speaker holes 21E are provided in the inner surface of the upper housing 21. Sound from a speaker 43 to be described later is output from the speaker holes 21E.

(Internal Configuration of Mobile Device 1)

Figure 7:
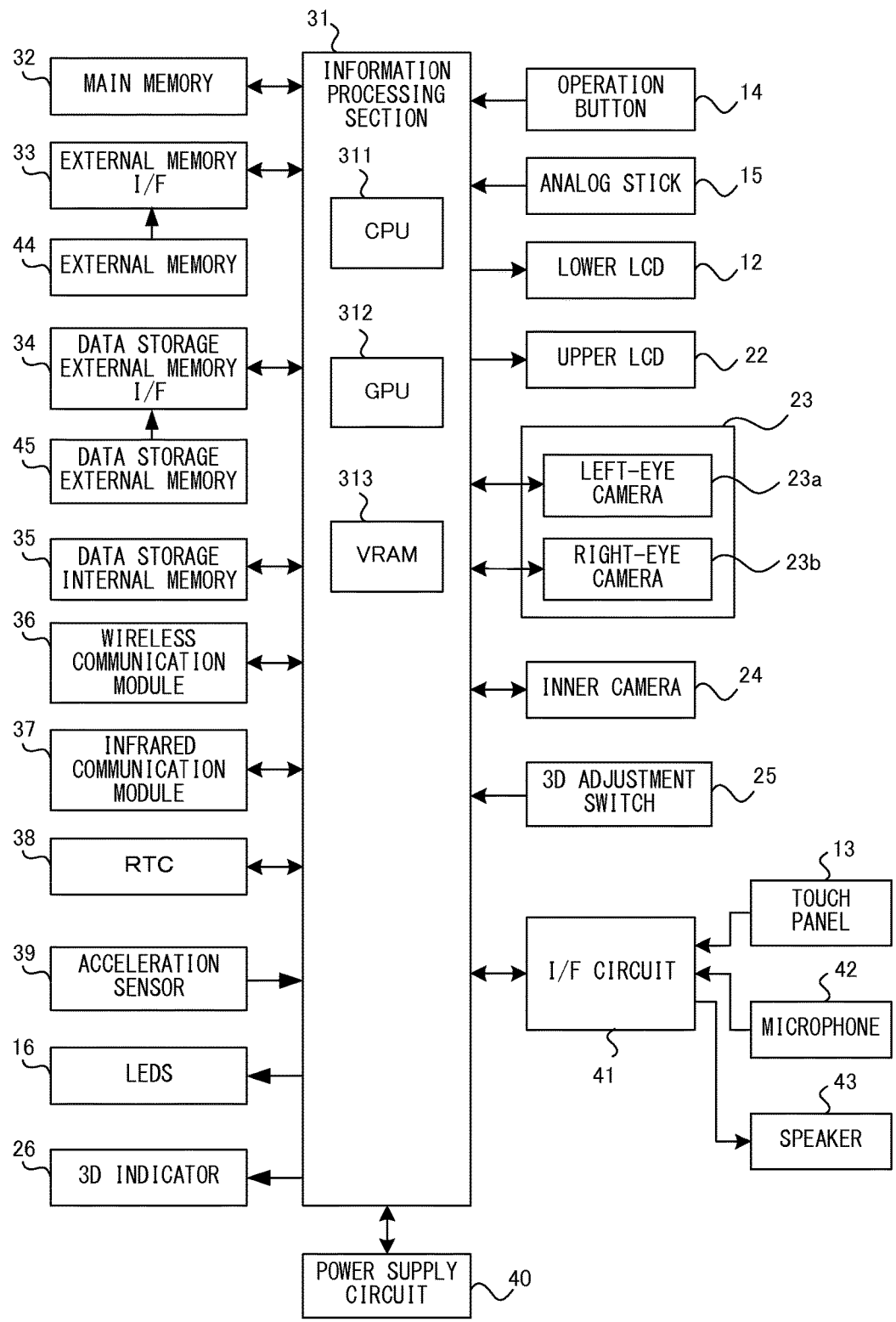
FIG. 7 is a block diagram showing an internal configuration of the example non-limiting mobile device.

Next, referring to FIG. 7, an internal electrical configuration of the mobile device 1 will be described. FIG. 7 is a block diagram showing an internal configuration of the mobile device 1. As shown in FIG. 7, the mobile device 1 includes electronic components such as an information processing section 31, a main memory 32, an external memory interface (external memory I/F) 33, a data storage external memory I/F 34, a data storage internal memory 35, a wireless communication module 36, an infrared communication module 37, a real time clock (RTC) 38, an acceleration sensor 39, a power supply circuit 40, and an interface circuit (I/F circuit) 41 and the like, in addition to the components described above. These electronic components are mounted on an electronic circuit substrate and accommodated in the lower housing 11 (or in the upper housing 21).

The information processing section 31 is an information processing section including a CPU (Central Processing Unit) 311 for executing a predetermined program or a GPU (Graphics Processing Unit) 312 for performing image processes. In this embodiment, a program for performing a predetermined process is stored in a memory (e.g., the external memory 44 connected to the external memory I/F 33, or the data storage internal memory 35) in the mobile device 1. The CPU 311 of the information processing section 31 executes the program, thereby performing a process according to the program (e.g., an image-capturing process, an image display process to be described later, etc.). Note that a program to be executed by the CPU 311 of the information processing section 31 may be obtained from other devices through communication with the other devices. The information processing section 31 includes a VRAM (Video RAM) 313. The GPU 312 of the information processing section 31 produces an image in accordance with an instruction from the CPU 311 of the information processing section 31, and renders the image in the VRAM 313. The GPU 312 of the information processing section 31 outputs the image rendered in the VRAM 313 to the upper LCD 22 and/or the lower LCD 12, thereby displaying the image on the upper LCD 22 and/or the lower LCD 12.

The main memory 32, the external memory I/F 33, the data storage external memory I/F 34, and the data storage internal memory 35 are connected to the information processing section 31. The external memory I/F 33 is an interface for detachably connecting the external memory 44. The data storage external memory I/F 34 is an interface for detachably connecting the data storage external memory 45.

The main memory 32 is a volatile storage section used as a work area and a buffer area for (the CPU 311 of) the information processing section 31. That is, the main memory 32 temporarily stores various data used for the process based on the program, or temporarily stores a program obtained from the outside (the external memory 44, other devices, etc.). In this embodiment, a PSRAM (Pseudo-SRAM) is used as the main memory 32, for example.

The external memory 44 is a non-volatile storage section for storing a program to be executed by the information processing section 31. The external memory 44 is formed by a read-only semiconductor memory, for example. When the external memory 44 is connected to the external memory I/F 33, the information processing section 31 can load the program stored in the external memory 44. A predetermined process is performed by the information processing section 31 executing the loaded program. The data storage external memory 45 is formed by a non-volatile readable/writable memory (e.g., a NAND-type flash memory), and is used for storing predetermined data. For example, the data storage external memory 45 stores images captured by the outer camera 23 and images captured by other devices. When the data storage external memory 45 is connected to the data storage external memory I/F 34, the information processing section 31 can load images stored in the data storage external memory 45, and display the images on the upper LCD 22 and/or the lower LCD 12.

The data storage internal memory 35 is formed by a non-volatile readable/writable memory (e.g., a NAND-type flash memory), and is used for storing predetermined data. For example, the data storage internal memory 35 stores data and programs downloaded through wireless communication via the wireless communication module 36.

The wireless communication module 36 has a function of connecting to a wireless LAN by a scheme based on the IEEE 802.11.b/g standard, for example. The infrared communication module 37 has a function of performing infrared communication with other devices (e.g., the peripheral device 2 or a game device of the same type). The wireless communication module 36 and the infrared communication module 37 are connected to the information processing section 31. The information processing section 31 can transmit or receive data to or from other devices via the Internet by using the wireless communication module 36, and can transmit or receive data to or from other game devices by using the infrared communication module 37.

The acceleration sensor 39 is connected to the information processing section 31. The acceleration sensor 39 detects magnitudes of acceleration (linear acceleration) of straight lines along the directions of three axes (xyz axes). The acceleration sensor 39 is provided inside the lower housing 11. The acceleration sensor 39 detects magnitudes of linear acceleration of the axes, where the x axis is the long-side direction of the lower housing 11, the y axis is the short-side direction of the lower housing 11, and the z axis is the direction vertical to the inner surface (main surface) of the lower housing 11, as shown in FIG. 1. For example, the acceleration sensor 39 may be one of those of types that are available from Analog Devices, Inc. or STMicroelectronics N.V. Note that while the acceleration sensor 39 is assumed to be, for example, an electrostatic capacitance type acceleration sensor, other types of acceleration sensors may be used. The acceleration sensor 39 may be an acceleration sensor which performs detection in one or two axial directions. The information processing section 31 can use data representing acceleration (acceleration data) detected by the acceleration sensor 39 to calculate the orientation and the movement of the mobile device 1.

The mobile device 1 may include a gyrosensor instead of, or in addition to, the acceleration sensor 39. The gyrosensor detects an angular velocity around a predetermined axis (e.g., the xyz axis mentioned above). Data representing the angular velocity detected by the gyrosensor is output to the information processing section 31. The information processing section 31 can use the data representing the angular velocity (angular velocity data) detected by the gyrosensor to calculate the orientation and the movement of the mobile device 1.

The RTC 38 and the power supply circuit 40 are connected to the information processing section 31. The RTC 38 counts the time, and outputs it to the information processing section 31. The information processing section 31 calculates the current time (date) based on the time counted by the RTC 38. The power supply circuit 40 controls the power from the power supply (the rechargeable battery described above accommodated in the lower housing 11) of the mobile device 1, and supplies power to components of the mobile device 1.

An I/F circuit 41 is connected to the information processing section 31. A microphone 42 and the speaker 43 are connected to the I/F circuit 41. Specifically, the speaker 43 is connected to the I/F circuit 41 via an amplifier (not shown). The microphone 42 detects sound of the user, and outputs a sound signal to the I/F circuit 41. The amplifier amplifies the sound signal from the I/F circuit 41, and has the speaker 43 output the sound. The touch panel 13 is connected to the I/F circuit 41. The I/F circuit 41 includes a sound control circuit for controlling the microphone 42 and the speaker 43 (amplifier), and a touch panel control circuit for controlling the touch panel 13. The sound control circuit performs A/D conversion and D/A conversion on a sound signal, or converts a sound signal to sound data of a predetermined format. The touch panel control circuit produces touch position data of a predetermined format based on a signal from the touch panel 13, and outputs it to the information processing section 31. The touch position data represents the coordinates of the position on the input surface of the touch panel 13 at which an input has been made. Note that the touch panel control circuit reads a signal from the touch panel 13 and produces the touch position data once per a predetermined period of time. The information processing section 31 can know the position at which an input has been made on the touch panel 13 by obtaining the touch position data.

The operation section 14 includes the operation buttons 14A through 14L, and is connected to the information processing section 31. Operation data representing the input status of each of the operation buttons 14A through 14I (whether the respective button has been pressed) is output from the operation section 14 to the information processing section 31. The information processing section 31 obtains the operation data from the operation section 14 to perform a process in accordance with the input on each of the operation buttons 14A through 14I.

The lower LCD 12 and the upper LCD 22 are connected to the information processing section 31. The lower LCD 12 and the upper LCD 22 display images in accordance with an instruction from (the GPU 312 of) the information processing section 31. In this embodiment, the information processing section 31 has the upper LCD 22 display a stereoscopic image (a stereoscopically viewable image) using a right-eye image and a left-eye image.

Specifically, the information processing section 31 is connected to an LCD controller (not shown) of the upper LCD 22, and controls the ON/OFF status of the parallax barrier for the LCD controller. When the parallax barrier of the upper LCD 22 is ON, a right-eye image and a left-eye image stored in the VRAM 313 of the information processing section 31 are output to the upper LCD 22. More specifically, the LCD controller reads out the right-eye image and the left-eye image from the VRAM 313 by alternately repeating the process of reading out one line of pixel data of the right-eye image in the vertical direction and the process of reading out one line of pixel data of the left-eye image in the vertical direction. Thus, the right-eye image and the left-eye image are each divided into strip-shaped images each including pixels arranged in one vertical line, and an image is displayed on the screen of the upper LCD 22 in which the separated strip-shaped images of the right-eye image and the separated strip-shaped images of the left-eye image alternate with each other. Then, as the image is viewed by the user via the parallax bather of the upper LCD 22, the right-eye image is viewed by the right eye of the user and the left-eye image by the left eye of the user. As described above, a stereoscopically viewable image is displayed on the screen of the upper LCD 22.

The outer camera 23 and the inner camera 24 are connected to the information processing section 31. The outer camera 23 and the inner camera 24 capture images in accordance with instructions of the information processing section 31, and output captured image data to the information processing section 31.

The 3D adjustment switch 25 is connected to the information processing section 31. The 3D adjustment switch 25 transmits to the information processing section 31 an electrical signal in accordance with the position of the slider.

The 3D indicator 26 is connected to the information processing section 31. The information processing section 31 controls lighting of the 3D indicator 26. For example, when the upper LCD 22 is in the stereoscopic display mode, the information processing section 31 lights the 3D indicator 26. So far, the internal configuration of the mobile device 1 has been described.

[3. Configuration of Peripheral Device]

Hereinafter, a configuration of the peripheral device 2 will be described. First, an overview of the peripheral device will be described. In this embodiment, the peripheral device 2 includes an additional function section, an infrared communication section, and a support section. Namely, the peripheral device 2 supports the mobile device 1 by the support section, communicates with the supported mobile device 1 by the infrared communication section, and adds a predetermined function to the mobile device 1 by the additional function section.

The additional function section is a member having a predetermined function to be added to the mobile device 1. The predetermined function of the additional function section may be any function. In this embodiment, the peripheral device 2 adds an operation function as the predetermined function. Specifically, the additional function section includes an operation section which includes the slide pad 57a, the operation button 57b and the like shown in FIG. 1. In other embodiments, the additional function section may include a sensor section for sensing predetermined information, such as an acceleration sensor, a gyrosensor, a GPS sensor or the like. Alternatively, the additional function section may include, for example, a receiving section for receiving a predetermined signal (e.g., an antenna for receiving a TV broadcast signal). Still alternatively, the additional function section may include, for example, a display section.

The above-described infrared communication section (an infrared communication section 62 shown in FIG. 11) is a member capable of performing infrared communication with the mobile device 1. In the state where the peripheral device 2 is mounted on the mobile device 1 (referred to as the "mounted state"), the infrared communication section 62 of the peripheral device 2 transmits or receives data (information) to or from the mobile device 1 by infrared communication. Namely, the infrared communication section 62 transmits data obtained by the predetermined function (e.g., operation data representing an operation to be made on the operation section 57, data sensed by the sensor section, data received by the receiving section, or the like) to the mobile device 1 by infrared communication. The infrared communication section 62 receives data for executing the predetermined function (e.g., image data to be displayed on the display section) from the mobile device 1 by infrared communication. In other embodiments, either one of the mobile device 1 and the peripheral device 2 may have only the transmission function while the other device may have only the receiving function. Namely, the infrared communication section 62 may have only one of the transmission function and the receiving function.

The support section is a member for detachably supporting the mobile device 1. The support section supports the mobile device 1 in a fixed manner (so that the positional relationship between the mobile device 1 and the peripheral device 2 is constant). The support section for supporting the mobile device 1 may have any specific configuration. Although the configuration will be described later in detail, the support section supports the mobile device 1 so that the infrared light emitting/receiving section 27 of the mobile device 1 is positioned so as to be capable of transmitting or receiving infrared light to or from the infrared communication section 62 of the peripheral device 2. Therefore, in this embodiment, the infrared communication is made possible between the mobile device 1 and the peripheral device 2 by mounting the peripheral device 2 on the mobile device 1. As a result, the function of the additional function section of the peripheral device 2 can be added to the mobile device 1. Namely, in this embodiment, the peripheral device 2 can be connected to the mobile device 1 with a simple configuration with no use of a connector.

Figure 8:
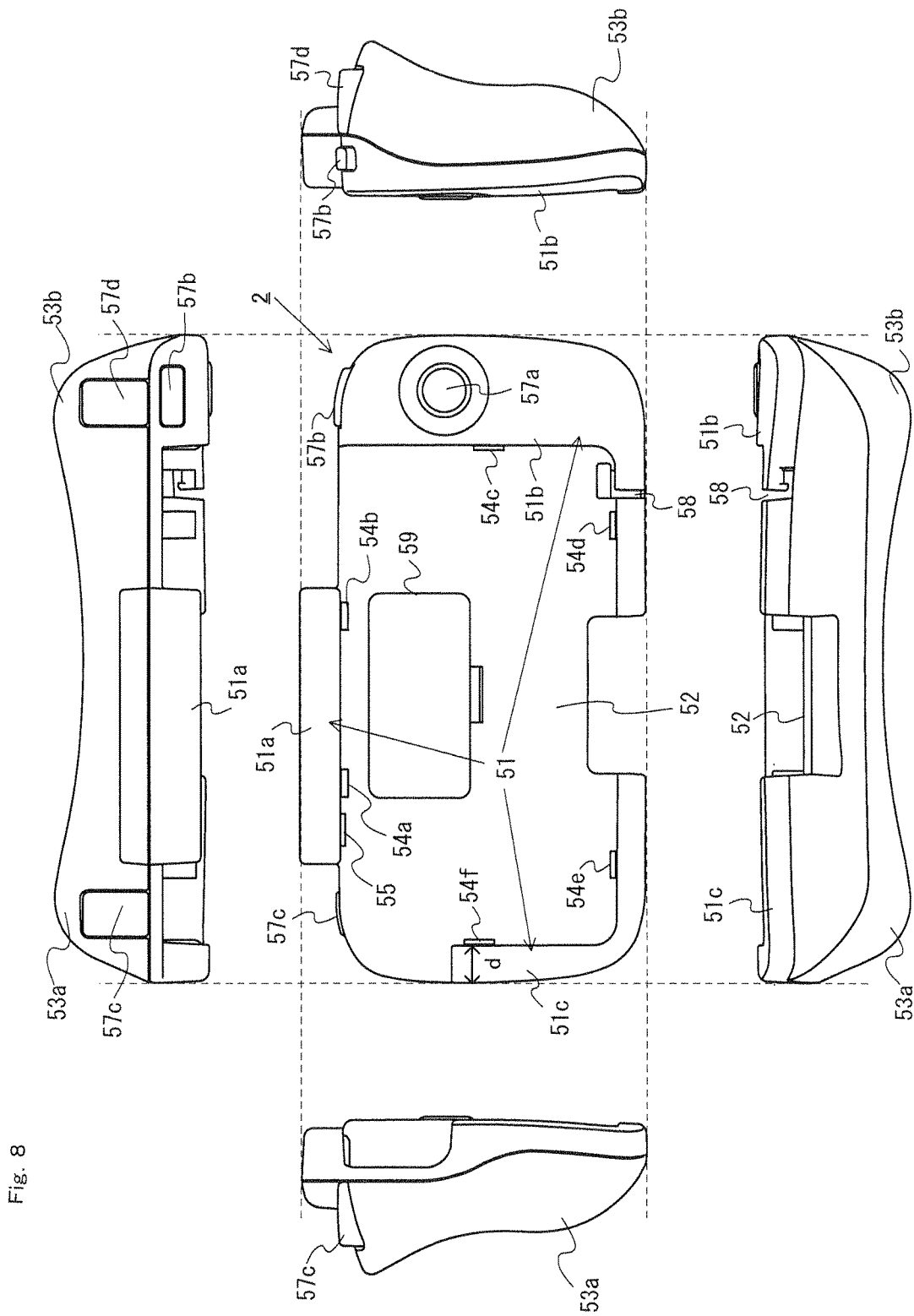
FIG. 8 is a plan view of an example non-limiting peripheral device.
Figure 9:
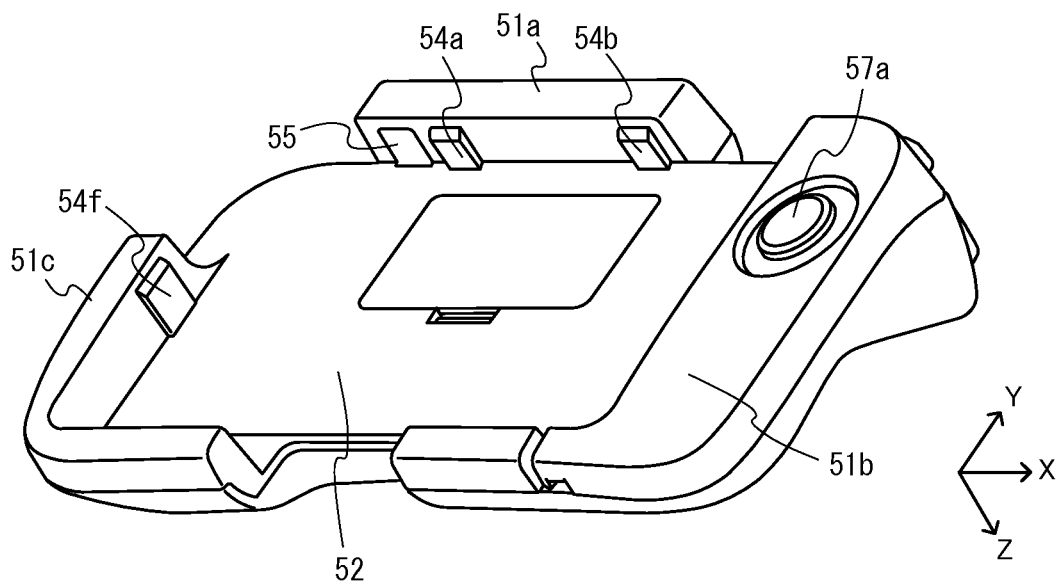
FIG. 9 is an isometric view of the example non-limiting peripheral device seen from the lower right front side.
Figure 10:
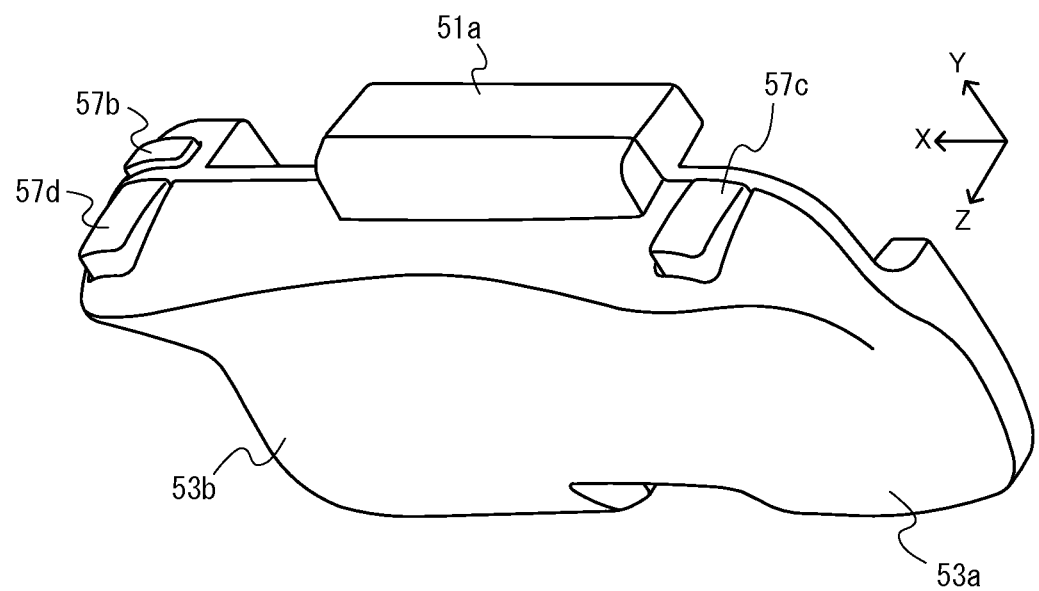
FIG. 10 is an isometric view of the example non-limiting peripheral device seen from the upper left rear side.

Hereinafter, with reference to FIG. 8 through FIG. 12, the configuration of the peripheral device 2 will be described in detail. FIG. 8 through FIG. 10 show an external appearance of the peripheral device 2. FIG. 8 is a plan view of the peripheral device 2. FIG. 9 is an isometric view of the peripheral device 2 seen from the lower right front side, and FIG. 10 is an isometric view of the peripheral device 2 seen from the upper left rear side.

(Description of Support Section)

The peripheral device 2 includes the support section for supporting the mobile device 1. In this embodiment, the support section includes a wall section 51 and a bottom surface section 52. As shown in FIG. 8 through FIG. 10, the bottom surface section is a member formed to be generally planar. The wall section 51 is provided along a peripheral edge of the bottom surface section 52. Specifically, the wall section 51 includes a first wall section 51a, a second wall section 51b, and a third wall section 51c. The first wall section 51a is provided along the upper side (the side in the positive direction of the Y axis shown in FIG. 9) of the bottom surface section 52. The second wall section 51b is provided along a right portion of the lower side (positive side of the X axis shown in FIG. 9) and the right side of the bottom surface section 52. The third wall section 51c is provided along a left portion of the lower side and the left side of the bottom surface section 52. Hereinafter, the support section will be described in detail.

The support section may support any position of the mobile device 1. In this embodiment, the support section supports the lower housing 11 of the mobile device (see FIG. 1). Namely, the support section is configured to be capable of supporting the lower housing 11. Specifically, the bottom surface section 52 is formed to have about the same size as that of the lower housing 11, which is plate-like. The wall section 51 is formed to be frame-like, and is configured so that a space enclosed by the frame (the space into which the lower housing 11 can be inserted) has a size in accordance with the size of the lower housing 11. Namely, the wall section 51 is configured so that the space has a size equal to, or slightly larger than, that of the housing 11.

In this manner, in this embodiment, the support section supports the housing (the lower housing 11) including the operation section (the operation buttons 14 or the slide pad 15) of the mobile device 1 of the foldable type. In this embodiment, when the peripheral device 2 is mounted on the mobile device 1, the user holds the peripheral device 2; whereas when the peripheral device 2 is not mounted on the mobile device 1, the user holds the lower housing 11 of the mobile device 1. Accordingly, in this embodiment, regardless of whether the peripheral device 2 is mounted or not, the user holds a lower portion of the mobile device 1. Therefore, even when the peripheral device 2 is mounted on the mobile device 1, the user can hold the mobile device 1 in substantially the same manner as when the peripheral device 2 is not mounted on the mobile device 1. This makes the peripheral device 2 easy to use. In other embodiments, the support section may support the upper housing 21, or both of the lower housing 11 and the upper housing 21, of the mobile device 1.

The support section may support any position of the lower housing 11. In this embodiment, the support section supports the side surfaces of the lower housing 11. Specifically, as shown in FIG. 8, the wall section 51 is formed to be frame-like and supports the lower housing 11 so as to enclose the lower housing 11 along the side surfaces thereof. Owing to this, the wall section 51 can support the mobile device 1 firmly, and can position the mobile device 1 in the mounted state. In this embodiment, the wall section 51 supports the mobile device 1 so that the mobile device 1 is fixed with respect to the peripheral device 2. In this embodiment, in order to fix the mobile device 1 with respect to the peripheral device 2, the support section encloses the mobile device 1 along the side surfaces thereof. In other embodiments, the support section may fix the mobile device 1 in any manner. For example, in other embodiments, the support section may fix the mobile device 1 by holding the upper side surface and the lower side surface of the mobile device 1.

The wall section 51 may support two or more side surfaces of the lower housing 11 among the four side surfaces thereof. In this embodiment, the wall section 51 supports the four side surfaces of the lower housing 11 (see FIG. 12). Specifically, the first wall section 51a supports the upper side surface of the lower housing 11. The second wall section 51b supports the left side surface and the lower side surface of the lower housing 11. The third wall section 51c supports the right side surface and the lower side surface of the lower housing 11. In this manner, in this embodiment, the wall sections 51a through 51c support the four side surfaces of the lower housing 11. Therefore, the peripheral device 2 can support the mobile device 1 firmly and position the mobile device 1 accurately.

In this embodiment, the wall section 51 is formed to face only a part of the entire side surfaces of the lower housing 11 (see FIG. 8). Namely, the wall section 51 is formed so as to have an opening in a portion thereof. In this embodiment, the wall section 51 is formed to be opened at positions corresponding to predetermined members provided on the side surfaces of the mobile device 1. The expression "positions corresponding to predetermined members" means the positions facing the predetermined members in the mounted state. Specifically, the wall section 51 in this embodiment are opened at the following positions: the position corresponding to the L button 14G of the mobile device 1, i.e., a left end portion of the upper side surface of the lower housing 11; the position corresponding to the sound volume adjustment switch 14I of the mobile device 1, i.e., an upper portion of the left side surface of the lower housing 1; the position corresponding to the R button 14H of the mobile device 1, i.e., a right end portion of the upper side surface of the lower housing 11; and the position corresponding to the sound output terminal 29 of the mobile device 1, i.e., a central portion of the lower side surface of the lower housing 11. Therefore, in this embodiment, the user can use the above-mentioned predetermined members of the mobile device 1 even in the mounted state. Namely, in this embodiment, even in the mounted state, the user can press the L button 14G, the R button 14I and the sound volume adjustment switch 14I, and insert or pull out an earphone or the like into or from the sound output terminal 29.

In other embodiments, the wall section 51 may be opened at other positions. For example, the wall section 51 may be opened at a position corresponding to the cover portion 11D of the external memory 44, i.e., a central position of the upper side surface the lower housing 11. Alternatively, for example, the wall section 51 may be opened at a position corresponding to the cover portion 11C of the data storage external memory 45, i.e., a lower portion of the left side surface the lower housing 11. In other embodiments, the wall section 51 may not have an opening. Namely, the wall section 51 may be formed to face the entire side surfaces of the lower housing 11 (i.e., formed to be ring-shaped).

The wall section 51 may have any height (length in the Z-axis direction). In this embodiment, the height of the wall section 51 is set to be (approximately) equal to the thickness of the lower housing 11. The height of the wall section 51 may be set to, for example, 5 mm or greater and 15 mm or less. The wall section 51 may have any width. The width of the wall section 51 may be set so that the entirety of the information processing system (the mobile device 1 and the peripheral device 2) is not excessively large in the mounted state. Width d (see FIG. 8) of a portion of the wall section 51 which supports the left side surface of the lower housing 11 (the third wall section 51c) may be set to such a value that the operation section (the slide pad 15 or the cross button 14A) of the mobile device 1 is operable with the user's hand holding the peripheral device 2. The width of the wall section 51 may be set to such a value that the wall section 51 is kept sufficiently strong and is not destroyed even when an impact is applied thereto when, for example, falling. For example, in this embodiment, the width of the wall section 51 is set to be 5 mm or greater and 20 mm or less except for a right side portion (positive side of the X axis) on which the operation section (the slide pad 57a) is provided.

In this embodiment, the support section supports one of the two housings of the mobile device 1 foldable with respect to each other, in a state where the surface of the one of the housings which is to be the inner surface when the housings are folded is exposed. Specifically, the support section supports the side surfaces of the lower housing 11 of the mobile device 1 and exposes the inner surface of each of the lower housing 11 and the upper housing 21. Accordingly, in this embodiment, the mobile device 1 of the foldable type can be opened or closed in the mounted state where the peripheral device 2 is mounted on the mobile device 1. The user can open or close the mobile device 1 without detaching the peripheral device 2 from the mobile device 1, which is convenient. In other embodiments, the support may support a predetermined surface, i.e., the inner surface of the lower housing 11 or the upper housing 21. For example, the support section may have a claw which is engageable with the inner surface of the lower housing 11 to support the mobile device 1.

The support section may support the mobile device 1 by any mechanism. In this embodiment, the support section supports the mobile device 1 by pressing the side surfaces of the mobile device 1 with an elastic material. Namely, a press member formed of an elastic material is provided on walls of the wall section 51 (surfaces facing the side surfaces of the mobile device 1 in the mounted state). Specifically, as shown in FIG. 8, the wall section 51 includes a plurality of (herein, six) press members 54a through 54f. The press members 54a through 54f are each formed of an elastic material such as rubber or the like. The plurality of press members may be located at any positions. In this embodiment, the press members 54a through 54f are provided at such positions that the wall section 51 presses the mobile device 1 on the four sides. Specifically, a first press member 54a and a second press member 54b are provided on the wall of the first wall section 51a. A third press member 54c is provided on a right wall of the second wall section 51b. A fourth press member 54d is provided on a lower wall of the second wall section 51b. A fifth press member 54e is provided on a lower wall of the third wall section 51c. A sixth press member 54f is provided on a left wall of the third wall section 51c. In this manner, in this embodiment, the press members 54a through 54f press the mobile device 1 on the four sides, and thus the mobile device 1 is supported. Owing to this, the peripheral device 2 can support the mobile device 1 firmly with a good balance. In other embodiments, a plurality of press members may be located at such positions as to press the mobile device 1 on two or three sides.

In this embodiment, a portion of the peripheral device 2 which contacts the mobile device 1 is formed of an elastic member. This can reduce the possibility that portions of the mobile device 1 and the peripheral device 2 which are in contact with each other are destroyed by an impact. Namely, even when an impact is applied to the information processing system (the mobile device 1 having the peripheral device 2 mounted thereon) when, for example, the information processing system falls, the possibility that these two devices are destroyed is reduced. Thus, the devices which are not easily destroyed can be provided.

In addition, in this embodiment, the communication between the mobile device 1 and the peripheral device 2 is made by infrared communication, and thus regarding the communication, the mobile device 1 and the peripheral device 2 are out of contact with each other. Therefore, in this embodiment, the peripheral device 2 is connected to the mobile device 1 only by a support mechanism for supporting the mobile device 1. In the case where these devices are physically connected with each other by a connector or the like, these devices are also connected with each other by a configuration for communication in addition to the support mechanism. Accordingly, in this embodiment, if an impact is applied to the information processing system, the impact received by the supporting mechanism is greater than in the case where mobile devices are physically connected with each other by a connector or the like. For this reason, in this embodiment, it is effective to adopt a support mechanism using the elastic material as described above, which is not easily destroyed even if a large impact is applied.

In other embodiments, the support section may include a claw engageable with a depressed portion of the mobile device 1 as a mechanism for supporting the mobile device 1. For example, in the case where the mobile device 1 has a depressed portion, the support section may support the mobile device 1 by putting the claw into engagement with the depressed portion.

In this embodiment, the wall section 51 (the second wall section 51b) has a slit 58 at a position corresponding to one of the strap holes 11F provided on the side surface of the mobile device 1. Therefore, in the case where a strap is attached to the strap hole 11F, the strap can be inserted into the slit 58 in the mounted state. Owing to this, even when a strap is attached to the side surface of the mobile device 1, the user can insert the mobile device 1 into the space formed by the frame-like wall section 51 and thus can easily mount the peripheral device 2 on the mobile device 1. In the state where the strap is inserted into the slit 58, the mobile device 1 and the peripheral device 2 are not easily detached from each other even if the mobile device 1 having the peripheral device 2 mounted thereon is dropped. In addition, in this embodiment, as shown in FIG. 8, the slit 58 is formed to be hook-like as seen in a direction perpendicular to the side surface of the wall section 51 in which the slit 58 is provided. Owing to this, the strap is not easily detached from the slit 58, and as a result, it is made difficult to detach the mobile device 1 and the peripheral device 2 from each other.

The bottom surface section 52 of the support section supports the outer surface of the mobile device 1 (the lower housing 11). The bottom surface section 52 may be formed to cover the entirety of, or a part of, the surface to be supported (herein, the outer surface of the lower housing 11). In this embodiment, the bottom surface section 52 is formed to expose a part of the outer surface of the lower housing 11. Owing to this, the user can detach the peripheral device 2 from the mobile device 1 by pushing the outer surface of the lower housing 11. Therefore, the user can easily detach the peripheral device 2 without, for example, holding the upper housing 21. In this embodiment, the support section supports the mobile device 1 while exposing a lower portion (negative side of the Y axis) of the outer surface. Owing to this, the user can easily detach the peripheral device 2 by putting the thumb of his/her left hand or the right hand on the outer surface and pushing the outer surface of the lower housing 11. In the case where the wall section 51 has an opening so that the exposed portion of the outer surface and the exposed portion of the side surface are continuous to each other as in this embodiment, the peripheral device 2 can be detached especially easily. In the case where the mobile device 1 includes the two housings which can be opened/closed (folded) as in this embodiment, the exposed portion of the outer surface of the housing supported by the support section (herein, the lower housing 11) may be located along a side (herein, the lower side) different from the side along which the two housings are connected with each other (herein, the upper side). Owing to this, even in the state where the two housings are opened with respect to each other, the peripheral device 2 can be easily detached by pushing the exposed portion.

In this embodiment, the peripheral device 2 includes a detachable battery lid 59 detachable from the peripheral device 2. A battery as a power supply of the peripheral device 2 is located inside the battery lid 59, and the user can replace the battery in the state where the battery lid 59 is detached. The battery lid 59 may be provided at any position. In this embodiment, the battery lid 59 is provided in the bottom surface section 52. Since the battery lid 59 is covered with the mobile device 1 in the mounted state, the battery lid 59 can be prevented from being detached and thus the battery can be prevented from coming off.

(Description of Infrared Communication Section)

The above-described infrared communication section 62 includes a light emitting/receiving section 55 for transmitting or receiving infrared light. The light emitting/receiving section 55 may be provided at any position of the peripheral device 2. In this embodiment, the light emitting/receiving section 55 is provided on the wall section 51. The light emitting/receiving section 55 includes, for example, an infrared filter for transmitting light of a predetermined frequency band and a module located inside the infrared filter for receiving or transmitting infrared light. The light emitting/receiving section 55 may have substantially the same configuration as that of the light emitting/receiving section 27 of the mobile device 1 described above. The light emitting/receiving section 55 is provided at a position corresponding to the light emitting/receiving section 27 of the mobile device 1, in other words, at a position of the wall section 51 facing the light emitting/receiving section 27 of the mobile device 1. Specifically, as shown in FIG. 8 and FIG. 9, the light emitting/receiving section 55 is provided on the first wall section 51a for supporting the upper side surface of the lower housing 11. This realizes infrared communication between the mobile device 1 and the peripheral device 2 in the mounted state. This will be described later in detail.

(Holding Section)

The peripheral section 2 may include a holding section which can be held by the user. In the case where the peripheral device 2 is mounted on the mobile device 1, the size of the entire device (the mobile device 1 and the peripheral device 2) is increased as compared with when the mobile device 1 is used independently. However, by providing the peripheral device 2 with the holding section, the entire device can be made easy to be held. In this embodiment, as shown in FIG. 10, the peripheral device 2 includes holding sections 53a and 53b. The holding sections 53a and 53b may be provided at any positions. In this embodiment, the holding sections 53a and 53b are located on a surface rear to an operation surface of the mobile device 1. The "operation surface of the mobile device 1" is the surface exposed in the mounted state, which is looked at by the user in use. Here, the operation surface is the inner surface (main surface) of the lower housing 11. Specifically, the holding sections 53a and 53b are located on a surface rear to the bottom surface section 52. Owing to this, the user can look at the operation surface while holding the holding sections 53a and 53b. Namely, the user can use the mobile device 1 while holding the peripheral device 2 in the mounted state. Moreover, in this embodiment, the holding sections 53a and 53b are formed to be convexed. Owing to this, the user can easily hold the peripheral device 2 with fingers (the third finger(s) or the little finger(s)) touching the convexed portions.

(Operation Section)

In this embodiment, the peripheral device 2 includes the operation section 57 as the additional function section described above. The operation section 57 may include any type and any number of operation member(s) at any position. In this embodiment, the operation section 57 includes the slide pad 57a, an additional R button 57b, a ZL button 57c and a ZR button 57d. In this embodiment, the operation section 57 includes the operation buttons and the direction input device (slide pad). In other embodiments, the operation section 57 may include a track ball, a keyboard or the like.

The slide pad 57a is an example of direction input device capable of specifying a direction and a magnitude. The slide pad 57a may be located at any position. In this embodiment, the slide pad 57a is provided on a surface of the wall section 51 (the second wall section 51b) for supporting the inner surface of the lower housing 11 (see FIG. 8). Namely, the slide pad 57a is located to the side of (herein, to the right of) the operation surface of the lower housing 11 in the mounted state. The slide pad 57a is located at such a position as to be operable with the user's thumb when the user holds the left side and the right side of the peripheral device 2 in the mounted state. In other embodiments, the slide pad 57a may be located on, for example, the surface rear to the operation surface of the mobile device 1, or below the operation surface, in the mounted state.

The operation section 57 includes the additional R button 57b. The additional R button 57b may be located at any position of the peripheral device 2. In this embodiment, the additional R button 57b is provided on the upper side surface (positive side of the Y axis) of a portion of the second wall section 51 which supports the right side surface of the lower housing 11 (see FIG. 8). Namely, the additional R button 57b is located outer to the R button 14H of the mobile device 1 (outer as seen from the center of the mobile device 1 in the left-right direction) in the mounted state. The additional R button 57b is located at such a position as to be operable with the user's index finger (or second, i.e., middle finger) when the user holds the left side and the right side of the peripheral device 2 in the mounted state.

In this embodiment, the slide pad 57a is located to the right of the mobile device 1 in the mounted state. This makes it difficult for the user to press the R button 14H of the mobile device 1. Hence, in this embodiment, the additional R button is provided on the same side as the slide pad 57a with respect to the mobile device 1. Owing to this, in the case where, for example, the additional R button 57b is assigned the same function as that of the R button 14H in a game application executed by the mobile device 1, the user can use the additional R button 57b instead of the R button 14H. In this manner, owing to the provision of the additional R button 57b, even in the mounted state, the user can easily make an operation which is to be made by the R button 14H. This prevents the peripheral device 2 from decreasing the operability of the mobile device 1. Moreover, in this embodiment, the additional R button 57b is located at such a position as to be operable with the user's finger (the index finger or the middle finger of the user's right hand) which can be used to operate the R button 14H when the peripheral device 2 is not mounted on the mobile device 1. Accordingly, the user can use the additional R button 57b in the same operational sense as for the R button 14H, which improves the operability of the peripheral device 2.

The additional R button 57b may be pressed in any direction (may be allowed to be pressed in any direction). In this embodiment, the additional R button 57b is pressed in the same direction as the R button 14H of the mobile device 1 (i.e., downward). Accordingly, the user can operate the additional R button 57b in substantially the same sense as for the R button 14H of the mobile device 1, which improves the operability.

The operation section 57 includes the ZL button 57c and the ZR button 57d. The ZL button 57c and the ZR button 57d may be located at any positions of the peripheral device 2. In this embodiment, as shown in FIG. 8 and FIG. 10, the ZL button 57c is provided on an upper left portion of the peripheral device 2, and the ZR button 57d is provided on an upper right portion of the peripheral device 2. Namely, in the mounted state, the ZL button 57c is located upper left with respect to the operation surface of the mobile device 1, and the ZR button 57d is located upper right with respect to the operation surface of the mobile device 1. The ZL button 57c is located rearward (in the positive direction of the Z axis) with respect to the L button 14G of the mobile device 1 in the mounted state. The ZR button 57d is located rearward with respect to the additional R button 57b. In this manner, the ZL button 57c and the ZR button 57d are located at such positions as to be operable with the user's middle finger (or index finger) when the user holds the left side and the right side of the peripheral device 2 in the mounted state. The pressing direction of the ZL button 57c and the ZR button 57d may be any direction. In this embodiment, the pressing direction is set to be downward and slightly forward (negative side of the Z-axis direction).

(Internal Configuration of Peripheral Device 2)

Figure 11:
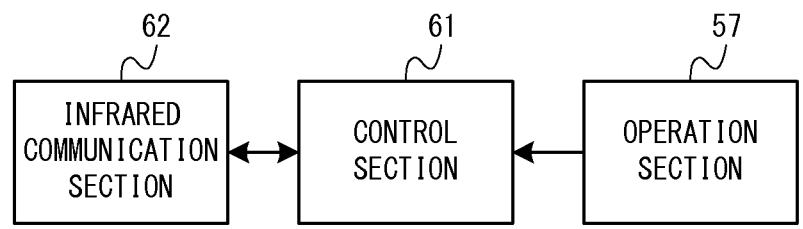
FIG. 11 is a block diagram showing an internal configuration of the example non-limiting peripheral device.

FIG. 11 is a block diagram showing an internal configuration of the peripheral device 2. As shown in FIG. 11, the peripheral device 2 includes the operation section 57, a control section 61, and the infrared communication section 62. The operation section 57 is connected to the control section 61, and the control section 61 is connected to the infrared communication section 62.

The operation section 57 outputs operation data representing an operation to be made on the operation devices included in the operation section 57 (the slide pad 57a and the operation buttons 57b through 57d) to the control section 61. The control section 61 performs various types of information processes. For example, the control section 61 receives the operation data from the operation section 57, and outputs the operation data to the infrared communication section 62 so that the operation data is transmitted to the mobile device 1. Alternatively, for example, the control section 61 may control the power supply of the peripheral device 2. For example, in the case where no operation is made on each of the operation buttons 57b through 57d for a predetermined time duration, the control section 61 controls the respective operation button to be off (sleep state). When an operation is made on each of the operation buttons 57b through 57d, the control section 61 controls the respective operation button to be on. The infrared communication section 62 performs infrared communication with the mobile device 1. Specifically, when the operation data is output from the control section 61, the infrared communication section 62 converts the operation data into an infrared signal and emits infrared light. Upon receiving an infrared signal from the mobile device 1, the infrared communication section 62 outputs the received data to the control section 61. In this embodiment, the mobile device 1 may transmit an infrared signal representing a control instruction for controlling the peripheral device 2 to the peripheral device 2.

(Description of Information Processing System Including the Mobile Device 1 and the Peripheral Device 2 Mounted Thereon)

In this embodiment, for mounting the peripheral device 2 on the mobile device 1, the user inserts the lower housing 11 of the mobile device 1 into the space enclosed by the frame-like wall section 51. As a result, the side surfaces of the lower housing 11 are pressed by the press members 54a through 54f, and thus the lower housing 11 is supported by the support section.

Figure 12:
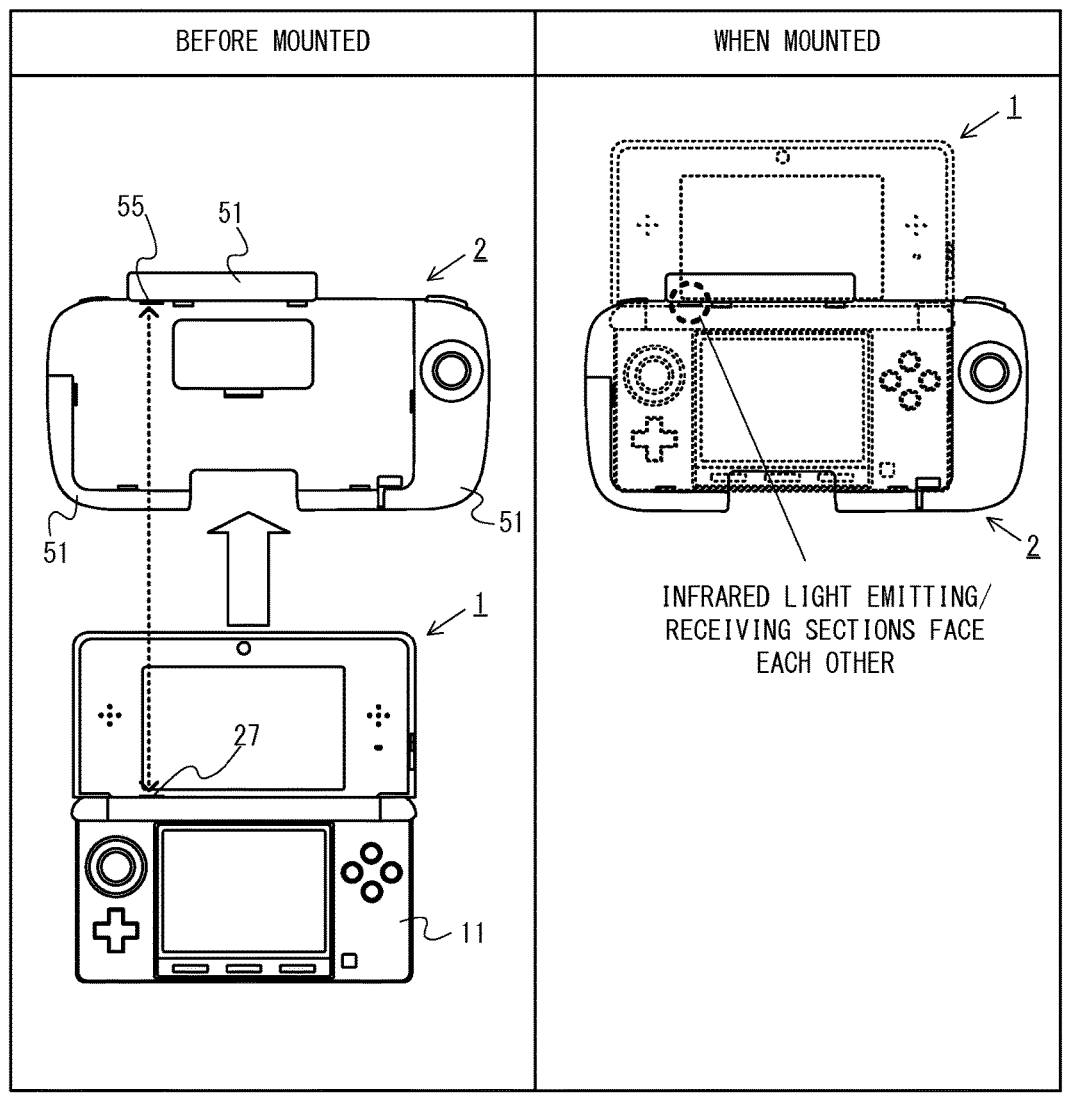
FIG. 12 shows the example non-limiting mobile device and the example non-limiting peripheral device before and after the example non-limiting peripheral device is mounted on the example non-limiting mobile device.

FIG. 12 shows the mobile device 1 and the peripheral device 2 before and after the peripheral device 2 is mounted. As described above, in this embodiment, the light emitting/receiving section 27 of the mobile device 1 is provided on the upper side surface of the lower housing 11, and the light emitting/receiving section 55 of the peripheral device 2 is provided at a position corresponding to the light emitting/receiving section 27 of the mobile device 1. Accordingly, as shown in FIG. 12, in the mounted state, the light emitting/receiving section 27 of the mobile device 1 and the light emitting/receiving section 55 of the peripheral device 2 are located to face each other. In other words, the support section (the wall section 51) supports the mobile device 1 so that the light emitting/receiving section 27 for infrared light of the mobile device 1 is positioned so as to be capable of transmitting or receiving infrared light to or from the infrared communication section 62 of the peripheral device 2.

In this manner, the support section supports the mobile device 1 so that the infrared communication section of the mobile device 1 and the infrared communication section of the peripheral device 2 are communicable with each other. Accordingly, in this embodiment, the mobile device 1 and the peripheral device 2 are made communicable with each other by mounting the peripheral device 2 on the mobile device 1. As a result, the function of the peripheral device 2 can be added to the mobile device 1. Namely, in this embodiment, the peripheral device 2 can be connected to the mobile device 1 with a simple configuration with no use of a connector.

With a connection method of putting the communication sections of two devices into contact with each other by use of a connector or the like, the connection portions (connector portions) of the two devices may be destroyed if the user inadvertently drops the devices at the time of connection. By contrast, in this embodiment, the communication sections are out of contact with each other at the time of mounting. Therefore, even if the user drops the devices, the possibility that the communication sections are destroyed is low. Thus, a safe information processing system can be provided. In the case where, for example, the mobile device 1 is a game device assumed to be used even by a child, or in the case where the mobile device 1 includes a sensor (herein, an acceleration sensor) for sensing the motion of the mobile device 1 itself and is assumed to be moved by the user in use, as in this embodiment, the connection method of this embodiment is effective by which the devices are not easily destroyed even if the user drops the devices.

In this embodiment, the mobile device 1 communicates with the peripheral device 2 by use of a communication function (infrared communication function) of the mobile device 1. Therefore, communication between the mobile device 1 and the peripheral device 2 can be made with no addition of a communication section to the mobile device 1. According to one example of conceivable communication method between the mobile device 1 and the peripheral device 2, a cartridge including a communication section communicable with the peripheral device 2 is inserted into the connector for connection with the external memory 44, so that the communication is made between the mobile device 1 and the peripheral device 2 via the cartridge. The peripheral device 2 in this embodiment is usable for many uses as compared with the above-described method.

In this embodiment, the light emitting/receiving section 27 is provided on the side surface of the mobile device 1, the wall section 51 encloses the side surfaces of the mobile device 1 in the mounted state, and the infrared communication section 62 (light emitting/receiving section 55) is provided at a position of the wall section 51 (the first wall section 51a) facing the light emitting/receiving section 27. Accordingly, the wall section 51 can support the mobile device 1 in the state where the operation surface is exposed, and also can position the mobile device 1 so that the light emitting/receiving section 27 is located at an appropriate position. Moreover, since the wall section 51 faces the light emitting/receiving section 27, the wall section 51 prevents external light (light other than light from the light emitting/receiving section 55) from being incident on the light emitting/receiving section 27. As described above, in this embodiment, the wall section 51 has a function of positioning the mobile device 1 so that the light emitting/receiving section 27 is located at an appropriate position and also a function of blocking external light. Owing to this, the peripheral device 2 can perform infrared communication with high precision.

As described above, the wall section 51 is formed to cover the light emitting/receiving section 27 in the mounted state. Specifically, in this embodiment, as shown in FIG. 8, the wall section 51 (the first section 51a) is formed along the light emitting/receiving section 55. In other embodiments, a press member formed of an elastic material may be provided around the light emitting/receiving section 55 so that a circumference of the light emitting/receiving section 27 is pressed by the press member in the mounted state. This configuration can also prevent external light from being incident on the light emitting/receiving section 27. In this embodiment, the two light emitting/receiving sections 27 and 55 are located so as to have almost no gap therebetween (see FIG. 12). In other embodiments, the two light emitting/receiving sections 27 and 55 may have a slight gap therebetween. As the gap is smaller, the light blocking effect provided by the wall section 51 is improved. Nonetheless, even if there is a slight gap, the wall section 51 of the peripheral device 2 can block external light to a certain extent.

In other embodiments, the light emitting/receiving section 27 may be provided on the outer surface of the mobile device 1 (the lower housing 11). Namely, the light emitting/receiving section 27 may be provided on a predetermined surface (outer surface) of the mobile device 1, the support section may have a portion facing the predetermined surface of the mobile device 1 in the mounted state, and the infrared communication section of the peripheral device 2 may be provided on the portion. In this configuration also, the portion of the support section can prevent external light from being incident on the light emitting/receiving section 27. In the case where the light emitting/receiving section 27 is provided on the outer surface of the lower housing 11, the bottom surface section 52 acts as the portion of the support section.

In the mounted state, the user can use the information processing system (the mobile device 1 and the peripheral device 2) while holding the peripheral device 2. In this embodiment, the holding sections 53a and 53b are respectively provided on the left side and the right side of the peripheral device 2. Therefore, the user can hold the left side and the right side of the information processing system with both of his/her hands. Specifically, when the user holds the information processing system with his/her left hand, the thumb is on the slide pad 15 or the cross button 14A of the mobile device 1, the index finger is on the L button 14G of the mobile device 1, the middle finger is on the ZL button 57c of the peripheral device 2, and the third finger and the little finger are on the holding section 53a of the peripheral device 2. When the user holds the information processing system with his/her right hand, the thumb is on the slide pad 57a of the peripheral device 2, the index finger is on the additional R button 57b of the peripheral device 2, the middle finger is on the ZR button 57d of the peripheral device 2, and the third finger and the little finger are on the holding section 53b of the peripheral device 2. Owing to this, the user can operate the mobile device 1 using the two slide pads 15 and 57a and at least four buttons 14G and 57b through 57d. Thus, a more complicated operation can be made as compared with the case where the mobile device 1 is used independently.

In this embodiment, the peripheral device 2 adds the operation section (slide pad 57a) to the right of the operation surface of the mobile device 1, but adds no operation section to the left of the operation surface of the mobile device 1. Namely, the mobile device 1 includes a predetermined operation member (slide pad 15) provided on one side (left side) of the operation surface in the left-right direction, and the operation section of the peripheral device 2 includes the operation member (including slide pad 57a) located on a portion which is outer to the operation surface and is on the opposite side to the one side in the mounted state. Owing to this, the user can hold the information processing system by holding the peripheral device 2 with his/her right hand and pressing the mobile device 1 with the thumb of his/her left hand. Since the user presses the mobile device 1 when holding the information processing system, the user's hand prevents the peripheral device 2 from being detached from the mobile device 1.

In this embodiment, the mobile device 1 includes the operation buttons respectively on left and right shoulder portions thereof. Namely, the mobile device 1 includes a first operation button (L button 14G) provided on one side of a predetermined side surface and a second operation button (R button 14H) provided on the other side of the predetermined side surface. Regarding the operation button provided on the left shoulder portion, the wall section 51 is opened at least in a portion facing the L button 14G Therefore, the user can easily operate the L button 14G as the operation button on the left shoulder portion in the mounted state. Regarding the operation button provided on the right shoulder portion, addition of the slide pad 57a to the right of the operation surface of the mobile device 1 makes it difficult to press the R button 14H. However, the additional R button 57b is provided to the right of the R button 14H. Namely, the operation section 57 includes the operation button (the additional R button 57b) located at a position on the other side beyond the R button 14H in the mounted state. Therefore, the user can easily operate the additional R button 57b as the operation button on the right shoulder portion in the mounted state. Accordingly, in this embodiment, the user can operate the operation buttons located on the left and right shoulder portions of the information processing system even in the mounted state, in substantially the same manner as when operating the mobile device 1 independently. Even in the mounted state, the user can operate the buttons with the index fingers or the middle fingers of his/her left and right hands, and thus can make a complicated operation.

In this embodiment, the operation section 57 includes the operation member (ZL button 57c) located rearward to the L button 14G in the mounted state and the operation member (ZR button 57d) located rearward to the additional R button 57b. Accordingly, in this embodiment, a total of four buttons are provided on the shoulder portions of the information processing system, i.e., two buttons are provided on the left shoulder portion and two buttons are provided on the right shoulder portion. Owing to this, the user can operate the buttons with the index and middle fingers (or with the middle and third fingers) when holding the peripheral device 2, and thus can make a complicated operation.

In this embodiment, among the four operation buttons located on the left and right shoulder portions, the operation buttons located closer to the user (L button 14G and the additional R button 57b) are set to be pressed downward, whereas the operation buttons located farther from the user (the ZL button 57*c* and the ZR button 57*d*) are set to be pressed toward the user rather than downward. Therefore, the user can easily press these buttons by operating the operation buttons located closer to the user with his/her index fingers and operating the operation buttons located farther from the user with his/her middle fingers.

[4. Modification]

The support section of the peripheral device 2 may be anything which detachably supports the mobile device 1, and is not limited to including the wall section 51 and the bottom surface section 52 as in the above embodiment. For example, the support section may be ring-shaped and support the side surfaces of the mobile device 1. In this case, the support section may or may not include a bottom surface section. The support section may be formed of an elastic and/or deformable material. In this case, the support section (peripheral device 2) is easily mounted on the mobile device 1, and the peripheral device 2 is easily mounted on any of a plurality of types of mobile devices having different sizes. In this modification, in the case where the peripheral device 2 has an operation section as an additional function section, the operation section may be located on a planar surface which is substantially the same as the operation surface of the mobile device 1, like the slide pad 57*a* in the above embodiment. In this case, the user can easily operate the operation section while looking at the operation surface.

The mobile device 1 and the peripheral device 2 may communicate with each other by wireless communication by, for example, the Bluetooth (registered trademark) or the like, instead of infrared communication. Namely, the mobile device 1 may have a wireless communication function and the peripheral device may include a communication section which is wirelessly communicable with the mobile device 1. In this case, the support section may detachably support the mobile device 1 and may not position the mobile device 1 so that the communication section of the mobile device 1 is located in correspondence with the communication section of the peripheral device 2. Even in the case where the mobile device 1 and the peripheral device 2 communicate with each other by wireless communication, the communication section of the mobile device 1 and the communication section of the peripheral device 2 are out of contact with each other regarding the communication as in the above embodiment. Owing to this, the two devices can be out of contact with each other for communication. Thus, a safe information processing system having a low possibility that the communication sections are destroyed is provided.

This embodiment is usable as a peripheral device or the like for adding an operation function to, for example, a mobile game device for the purpose of, for example, connecting the peripheral device to the mobile device with no use of a connector.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A gaming device for use with a mobile device, the mobile device comprising a touchscreen and a first button, the gaming device comprising:
   a front side, a rear side, and top side;
   a right shoulder button on the top side;
   a left shoulder button on the top side;
   a stick-type directional input device on the front side and capable of specifying direction and magnitude;
   a first convex portion on the rear side and protruding away from a surface of a right portion of the rear side of the gaming device;
   a second convex portion on the rear side and protruding away from a surface of a left portion of the rear side of the gaming device;
   an interface configured to communicate with the mobile device; and
   a holding portion configured to detachably hold the mobile device so that the touchscreen is on the front side and the interface can communicate with the mobile device;
   wherein the holding portion includes a first cut-out configured to expose the first button when the mobile device is held by the holding portion, and
   the stick-type directional input device is operable by a user's thumb when the user grips the first convex portion and the second convex portion.

2. The gaming device of claim 1, wherein the holding portion is configured to locate the touchscreen between the right portion and the left portion.

3. The gaming device of claim 1, wherein the first cut-out is shaped according to the shape of the first button.

4. The gaming device of claim 1, further comprising an additional right shoulder button tiered with the right shoulder button.

5. The gaming device of claim 1, wherein the first convex portion comprises a plurality of convex surfaces, and the second convex portion comprises a plurality of convex surfaces.

6. The gaming device of claim 1, wherein the first convex portion further comprises a first saddle surface between a first convex surface and a second convex surface and the second convex portion further comprises a second saddle surface between a third convex surface and a fourth convex surface.

7. The gaming device of claim 6, wherein the amount of protrusion of the first convex surface is larger than the amount of protrusion of the second convex surface.

8. The gaming device of claim 4, further comprising an additional right shoulder button tiered with the right shoulder button and wherein the right shoulder button and the additional right shoulder button are located on an upper area of the first convex portion.

9. The gaming device of claim 1, wherein the right shoulder button is located on an upper area of the first convex portion and the left shoulder button is located an upper area of the second convex portion.

10. The gaming device of claim 1, wherein the directional input device is located on an upper area of a main surface of the right side portion of the gaming device.

11. The gaming device of claim 10, wherein the directional input device is located adjacent the right shoulder button.

12. The gaming device of claim 10, wherein the main surface of the right side portion is flat.

13. The gaming device of claim 1, wherein the holding portion is configured to fix the mobile device so that the positional relationship between the mobile device and the gaming device is constant.

14. The gaming device of claim 1, wherein the holding portion is configured to elastically press at least two sides of the mobile device to hold the mobile device.

15. The gaming device of claim 14, wherein the holding portion is configured to elastically press at least a left side and a right side of the mobile device when the mobile device is held by the holding portion.

16. The gaming device of claim 1, wherein the holding portion is configured to press, at least in part, four sides of the mobile device to hold the mobile device.

17. The gaming device of claim 1, wherein the holding portion is configured to locate the directional input device between an upper edge and a lower edge of the touchscreen.

18. The gaming device of claim 1, wherein the holding portion is configured to locate the right shoulder button upward of the center of the touchscreen.

19. The gaming device of claim 1, wherein the holding portion is configured to locate the center of the touchscreen between the right portion and the left portion both in a vertical direction and in a horizontal direction.

20. The gaming device of claim 1, wherein the mobile device further includes an electrical device, and the holding portion further includes a second cut-out configured to expose the electrical device when the mobile device is held by the holding portion.

21. The gaming device of claim 1, wherein a portion of the gaming device covering an outer surface of the mobile device is narrower in a vertical direction than the right side portion so that a part of the outer surface is exposed.

22. The gaming device of claim 1, wherein the interface is located on the holding portion and the holding portion includes a wall configured to guide an interface of the mobile device to the interface of the gaming device during an insertion of the mobile device to the gaming device.

23. The gaming device of claim 1, wherein the touchscreen and the first button are on different surfaces of the mobile device.

24. The gaming device of claim 23, wherein the different surfaces face in different directions.

25. The gaming device of claim 1, wherein the holding portion has a surface that covers a part of the mobile device, and the first cutout is recessed from a boundary of the surface.

26. A gaming device for use with a mobile device, the mobile device comprising a touchscreen and a first button, the gaming device comprising:
- a front side, a rear side, and top side;
- a right shoulder button on the top side;
- a left shoulder button on the top side;
- a directional input device on the front side and capable of specifying direction and magnitude;
- a first convex portion on the rear side and protruding away from a surface of a right portion of the rear side of the gaming device;
- a second convex portion on the rear side and protruding away from a surface of a left portion of the rear side of the gaming device;
- an interface configured to communicate with the mobile device; and
- a holding portion configured to detachably hold the mobile device so that the touchscreen is on the front side and the interface can communicate with the mobile device;
- wherein the holding portion includes a first cut-out configured to expose the first button when the mobile device is held by the holding portion,
- the directional input device is operable by a user's thumb when the user grips the first convex portion and the second convex portion.

27. The gaming device of claim 1, wherein the interface requires line of sight to communicate with the mobile device.

28. The gaming device of claim 26, wherein the interface requires line of sight to communicate with the mobile device.

* * * * *